US012716011B2

(12) United States Patent
Czerwonatis et al.

(10) Patent No.: US 12,716,011 B2
(45) Date of Patent: Aug. 25, 2026

(54) ADHESIVE TAPE WITH POLYURETHANE CARRIER

(71) Applicant: TESA SE, Norderstedt (DE)

(72) Inventors: Franziska Czerwonatis, Hamburg (DE); Franciska Rademacher, Hamburg (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 17/404,506

(22) Filed: Aug. 17, 2021

(65) Prior Publication Data

US 2022/0056313 A1 Feb. 24, 2022

(30) Foreign Application Priority Data

Aug. 19, 2020 (DE) ..................... 10 2020 210 503.0
Aug. 19, 2020 (DE) ..................... 10 2020 210 505.7

(51) Int. Cl.
*C09J 7/25* (2018.01)
*B05D 1/26* (2006.01)
(Continued)

(52) U.S. Cl.
CPC ................ *C09J 7/25* (2018.01); *B05D 1/265* (2013.01); *B05D 5/10* (2013.01); *C08K 5/0025* (2013.01);
(Continued)

(58) Field of Classification Search
None
See application file for complete search history.

(56) References Cited

U.S. PATENT DOCUMENTS 6,613,870 B1 9/2003 Harder et al.
10,243,233 B2 3/2019 Park et al.
(Continued)

FOREIGN PATENT DOCUMENTS

CN 104512076 A 4/2015
CN 106470833 A 3/2017
(Continued)

OTHER PUBLICATIONS

Machine translation of DE_102018200957_A1 (Year: 2019).*
(Continued)

*Primary Examiner* — Frank D Ducheneaux
(74) *Attorney, Agent, or Firm* — Norris McLaughlin, P.A.

(57) ABSTRACT

The present invention relates to an adhesive tape comprising at least one carrier that has a thickness of 20 to 250 μm, preferably 50 to 150 μm, and has at least one layer (i) based on preferably uncrosslinked thermoplastic polyurethane that has been produced by means of extrusion, wherein the polyurethane is based on aromatic polyisocyanate, such as aromatic diisocyanate in particular, or (ii) based on preferably uncrosslinked polyurethane that has been produced from a dispersion, wherein a pressure-sensitive adhesive layer is disposed on at least one side, preferably both sides, of the carrier. The invention also relates to processes for producing the adhesive tape and to the use thereof for bonding of components in electrical, electronic, optical or precision mechanical devices, such as, in particular, of windows or lenses in housings of precision mechanical, optical and/or electronic devices.

13 Claims, 1 Drawing Sheet

(51) Int. Cl.

| | |
|---|---|
| ***B05D 5/10*** | (2006.01) |
| ***C08K 5/00*** | (2006.01) |
| ***C08K 7/22*** | (2006.01) |
| ***C09J 7/26*** | (2018.01) |
| ***C09J 7/38*** | (2018.01) |
| ***C09J 125/04*** | (2006.01) |
| ***C09J 133/08*** | (2006.01) |
| ***C09J 133/10*** | (2006.01) |
| ***C09J 153/02*** | (2006.01) |

(52) U.S. Cl.

CPC .................................... *C08K 7/22* (2013.01); *C09J 7/26* (2018.01); *C09J 7/385* (2018.01); *C09J 7/387* (2018.01); *C09J 125/04* (2013.01); *C09J 133/08* (2013.01); *C09J 133/10* (2013.01); *C09J 153/02* (2013.01); *C09J 2203/326* (2013.01); *C09J 2203/37* (2020.08); *C09J 2301/122* (2020.08); *C09J 2301/124* (2020.08); *C09J 2301/302* (2020.08); *C09J 2301/408* (2020.08); *C09J 2301/41* (2020.08); *C09J 2301/412* (2020.08); *C09J 2301/502* (2020.08); *C09J 2400/24* (2013.01); *C09J 2400/243* (2013.01); *C09J 2425/00* (2013.01); *C09J 2433/00* (2013.01); *C09J 2453/00* (2013.01); *C09J 2475/006* (2013.01)

(56) References Cited

U.S. PATENT DOCUMENTS

| | | | | |
|---|---|---|---|---|
| 10,435,594 | B2 | 10/2019 | Blazejewski et al. | |
| 10,759,974 | B2 | 9/2020 | Blazejewski et al. | |
| 2003/0108773 | A1* | 6/2003 | Matsubaguchi ......... | G11B 5/71<br>428/845.7 |
| 2005/0263243 | A1 | 12/2005 | Schumann et al. | |
| 2015/0086730 | A1 | 3/2015 | Guan et al. | |
| 2015/0337177 | A1 | 11/2015 | Krawinkel et al. | |
| 2017/0100923 | A1 | 4/2017 | Liu et al. | |
| 2017/0121573 | A1 | 5/2017 | Bogner et al. | |
| 2018/0079937 | A1 | 3/2018 | Blazejewski et al. | |
| 2018/0112110 | A1 | 4/2018 | Blazejewski et al. | |
| 2019/0300755 | A1 | 10/2019 | Devolder | |
| 2019/0390087 | A1 | 12/2019 | Blazejewski et al. | |
| 2020/0091472 | A1 | 3/2020 | Homann et al. | |
| 2020/0325362 | A1 | 10/2020 | Burmeister et al. | |
| 2021/0114361 | A1 | 4/2021 | Ho et al. | |

FOREIGN PATENT DOCUMENTS

| | | | | |
|---|---|---|---|---|
| CN | 110088182 | A | 8/2019 | |
| CN | 110564332 | A | 12/2019 | |
| CN | 110903453 | A | 3/2020 | |
| CN | 111440572 | A | 7/2020 | |
| DE | 43 13 008 | A1 | 10/1994 | |
| DE | 203 06 801 | U1 | 7/2003 | |
| DE | 10 2012 223 670 | A1 | 6/2014 | |
| DE | 10 2015 206 076 | A1 | 10/2016 | |
| DE | 10 2016 209 707 | A1 | 12/2017 | |
| DE | 102018200957 | A1 * | 4/2019 | ................ C09J 7/10 |
| EP | 748829 | A1 * | 12/1996 | ......... C08G 18/0895 |
| EP | 1095993 | A2 | 5/2001 | |
| EP | 3 075 772 | A1 | 10/2016 | |
| EP | 3 623 400 | A1 | 3/2020 | |
| EP | 3757157 | A1 | 12/2020 | |
| KR | 10-1680827 | B1 | 11/2016 | |
| WO | 2015/135134 | A1 | 9/2015 | |
| WO | WO-2016075753 | A1 * | 5/2016 | ............... B32B 5/18 |
| WO | WO2018109605 | A1 | 6/2016 | |
| WO | 2020/035761 | A1 | 2/2020 | |

OTHER PUBLICATIONS

Machine translation of WO 2016/075753 A1 (Year: 2016).*

English translation of Office Action dated May 7, 2022, in connection with Chinese Application No. 202110953236.7.

T.G. Fox, Bull. Am. Phys. Soc. 1956, 1, 123.

English translation of Office Action First Page, dated Aug. 9, 2022, in connection with Chinese Application No. 202110953236.7.

* cited by examiner

ADHESIVE TAPE WITH POLYURETHANE CARRIER

The present application claims priority of German Patent Application No. 10 2020 210 505.7, filed Aug. 19, 2020, and German Patent Application No. 10 2020 210 503.0, filed Aug. 19, 2020, the entire contents of which patent applications are hereby incorporated herein by reference.

The present invention relates to an adhesive tape comprising a carrier based on polyurethane, to processes for producing the adhesive tape, and to the use thereof for bonding of components in electrical, electronic, optical or precision mechanical devices.

DE 10 2012 223 670 A1 describes a pressure-sensitive adhesive film strip composed of at least two, especially three, layers that can be redetached without residue or destruction by stretching essentially in the plane of the bond, having a carrier on which there is a first, outer adhesive layer on at least one side, wherein the adhesive layer consists of an adhesive based on vinylaromatic block copolymers and tackifying resins, wherein at least 75% (based on the total resin content) of a resin is selected having a DACP (diacetone alcohol cloud point) of greater than −20° C., preferably greater than 0° C., and the carrier has at least one layer consisting of a polyurethane having an elongation at break of at least 100% and a resilience of more than 50%.

DE 10 2015 206 076 A1 describes a pressure-sensitive adhesive strip that can be redetached without residue or destruction by stretching essentially in the plane of the bond, composed of one or more adhesive layers that all consist of a pressure-sensitive adhesive foamed with microballoons, and optionally of one or more intermediate carrier layers, characterized in that the pressure-sensitive adhesive strip consists exclusively of the adhesive layers mentioned and any intermediate carrier layers present, and one outer upper and one outer lower face of the pressure-sensitive adhesive strip are formed by said adhesive layer(s).

EP 30 75 772 A1 describes a pressure-sensitive adhesive strip that can be redetached without residue or destruction by stretching essentially in the plane of the bond, comprising an adhesive layer, wherein the adhesive layer consists of a pressure-sensitive adhesive based on vinylaromatic block copolymers and tackifying resins, wherein at least 75% by weight (based on the total resin content) of a resin is selected having a DACP (diacetone alcohol cloud point) of greater than −20° C., preferably greater than 0° C., and a softening temperature (ring & ball) of not less than 70° C., preferably not less than 100° C., and wherein the pressure-sensitive adhesive has been foamed.

EP 3623400 A1 describes a polyurethane foam obtainable by mechanical foaming of a starting mixture of a polyurethane dispersion, where the polyurethane is composed of at least one polyisocyanate component and at least one polyol component, and at least one surfactant, characterized in that the polyol component or at least one of the polyol components includes at least one comonomer having flame-retardant action and containing two hydroxyl groups.

WO 2015 135134 A1 describes an adhesive tape detachable by stretching, comprising a carrier having a first surface and a second surface, wherein the carrier has been produced from crosslinked thermoplastic polyurethane, and pressure-sensitive adhesive disposed on at least one of the first and second surfaces, wherein the pressure-sensitive adhesive has been formed from an acrylic copolymer comprising a polyurethane having a terminal functional group, wherein the adhesive tape has a thickness in the range between 0.05 and 0.10 mm and extensibility in longitudinal direction of between 850% and 2200%, wherein the adhesive tape can be firmly bonded to a substrate and then can be removed therefrom after it has been stretched at an angle of 90° or more away from the surface of the substrate, without fracturing of the carrier prior to the removal of the adhesive tape from the substrate, and without leaving significant residues of the pressure-sensitive adhesive on the substrate.

WO 2020 035761 A1 describes a surface film comprising a base layer, wherein the base layer comprises a thermoplastic polyurethane film comprising a reaction product of a reaction mixture comprising a diisocyanate, a polyester polyol having a melting temperature of at least about 30° C., and a diol chain extender.

KR 101680827 B1 describes a process for producing a shock-resistant foam structure, comprising the following steps:

producing a foam composition in which pre-expanded particles and a binder composition are mixed, applying the foam composition to a substrate, performing a preliminary heat treatment on the foam composition applied in order to form a pre-foam, and converting the pre-foam by heat treatment to a heat-resistant foam structure composed of shock-resistant particles, wherein the pre-expanded particles are expanded.

US 2017121573 A1 describes an adhesive formulation comprising 50% to 99% adhesive component, 0% to 3% crosslinker, 0% to 3% antioxidant, and 0.1% to 10% expandable microspheres distributed within the formulation.

DE 10 2016 209 707 A1 relates to a pressure-sensitive adhesive strip composed of three layers, comprising (a) an inner layer F of a film carrier, (b) a layer SK1 of a self-adhesive composition disposed on one of the surfaces of the film carrier layer F and based on a foamed acrylate composition, and (c) a layer SK2 of a self-adhesive composition which is disposed on the opposite surface of the film carrier layer F from layer SK1 and is based on a foamed acrylate composition.

Proceeding from the prior art, the problem underlying the present invention is thus especially that of providing an adhesive tape having high shock resistance (impact resistance) and good redetachability, and also having only low stretching in the stretching test.

The problem is solved by an adhesive tape comprising at least one carrier that has a thickness of 20 to 250 μm, preferably of 50 to 150 μm, and has at least one layer (i) based on preferably uncrosslinked thermoplastic polyurethane that has been produced by means of extrusion, wherein the polyurethane is based on aromatic polyisocyanate, such as aromatic diisocyanate in particular, or (ii) based on preferably uncrosslinked polyurethane that has been produced from a dispersion, wherein a pressure-sensitive adhesive layer is disposed on at least one side, preferably both sides, of the carrier. The adhesive tape may therefore be a single-sided adhesive tape or a double-sided adhesive tape, and is preferably double-sided.

BRIEF DESCRIPTION OF THE DRAWINGS

The invention will now be described in greater detail with reference to the drawings, wherein.

Figure 1:
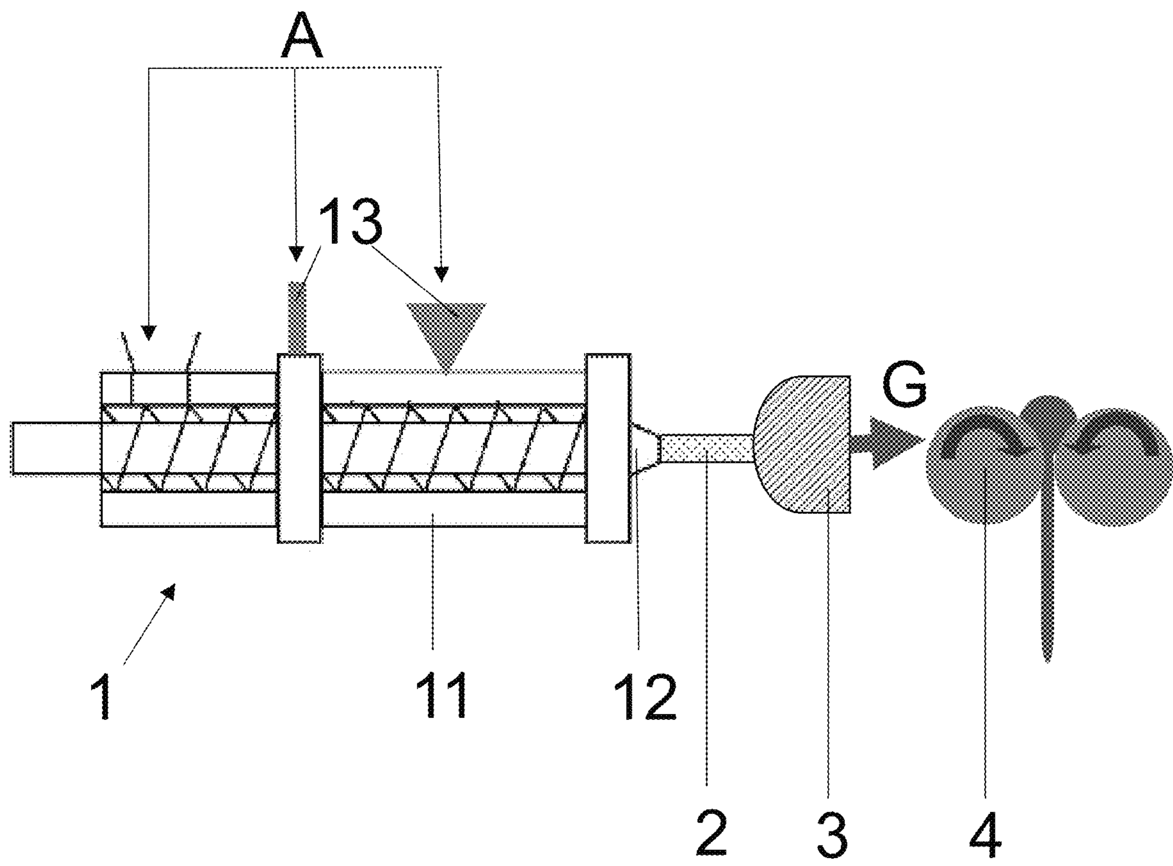
FIG. 1 shows, by way of example, the process for producing TPU carriers by means of extrusion of TPU and elongate sheet form.

In a preferred embodiment, the pressure-sensitive adhesive layers are disposed directly on the carrier and hence in contact with the carrier.

In a further preferred embodiment, the pressure-sensitive adhesive layers disposed on the carrier are themselves in turn coated with a functional layer. The pressure-sensitive adhesive layers here are on the outside in each case, so as to result in a single- or double-sided adhesive tape. The functional layer accordingly faces the polyurethane-based carrier according to the invention in each case. The functional layer may exert different functions. For example, it may be an additional carrier layer having the function of preventing migration between pressure-sensitive adhesive layer and carrier layer, or vice versa, for example of blocking tackifying resin migration. Furthermore, an additional carrier layer may have such a function that it improves the process of stamping of, for example, intricate shaped articles with thin element widths. Such an additional carrier layer may, for example, be a PET film having sufficient stiffness and strength for the stamped shaped articles not to become stretched or deformed, for example during the stamping process or during the application process. The functional layer according to the invention typically has a thickness of 5 to 100 μm, preferably 10 to 50 μm. The adhesive tape typically has an impact resistance in z direction according to the DuPont test in z direction and the drop tower test of at least 1.00 J in each case, good redetachability (i.e. essentially no tears and no more than slight adhesive residues that are easily removable with ethanol, which corresponds to a value of at least 4 in our test) and a stretching distance of not more than 0.15 mm in the stretching test.

The invention also relates to a process for producing an adhesive tape, in which a carrier as defined above, based on preferably uncrosslinked thermoplastic polyurethane based on aromatic polyisocyanate, (a) is extruded onto a temporary carrier and combined at least on one side, preferably on both sides, with a pressure-sensitive adhesive, or (b) is extruded onto a pressure-sensitive adhesive layer, and the carrier is preferably combined with a further pressure-sensitive adhesive on the opposite side from the pressure-sensitive adhesive layer, so as to result in an adhesive tape.

The process also includes embodiments in which the carrier is combined on one or both sides with a pressure-sensitive adhesive layer which is itself coated in turn with a functional layer. The pressure-sensitive adhesive layers are on the outside in each case, so as to result in a single- or double-sided adhesive tape. The functional layer accordingly faces the polyurethane-based carrier according to the invention in each case.

The process likewise includes embodiments in which the carrier is extruded onto a pressure-sensitive adhesive layer which is itself coated in turn with a functional layer. The pressure-sensitive adhesive layer is on the outside here, so as to result in a single-sided adhesive tape. The functional layer accordingly faces the polyurethane-based carrier according to the invention. If the carrier on the opposite side from the pressure-sensitive adhesive layer is combined with a further pressure-sensitive adhesive, this may itself again also be coated with a functional layer; the pressure-sensitive adhesive layer is on the outside here, so as to result in a double-sided adhesive tape. The functional layer accordingly faces the polyurethane-based carrier according to the invention.

The functional layer here is preferably defined as described above as a constituent of the adhesive tape according to the invention.

The invention further relates to a process for producing an adhesive tape, in which a dispersion based on preferably uncrosslinked polyurethane (a) is coated onto a temporary carrier and dried, and the resultant carrier as defined above is combined with a pressure-sensitive adhesive on at least one side, preferably on both sides, or (b) is coated onto a pressure-sensitive adhesive layer and dried, so as to result in a carrier as defined above, and the carrier is preferably combined with a further pressure-sensitive adhesive on the opposite side from the pressure-sensitive adhesive layer, 20 so as to result in an adhesive tape.

The process also includes embodiments in which the resultant carrier is combined on one or both sides with a pressure-sensitive adhesive layer which is itself coated in turn with a functional layer. The pressure-sensitive adhesive layers are on the outside in each case, so as to result in a single- or double-sided adhesive tape. The functional layer accordingly faces the polyurethane-based carrier according to the invention in each case.

The process likewise includes embodiments in which the polyurethane-based dispersion is coated onto a pressure-sensitive adhesive layer which is itself coated in turn with a functional layer, and dried. The pressure-sensitive adhesive layer is on the outside here, so as to result in a single-sided adhesive tape. The functional layer accordingly faces the resultant polyurethane-based carrier according to the invention. If the resultant carrier is combined with a further pressure-sensitive adhesive on the opposite side from the pressure-sensitive adhesive layer, this too may itself in turn be coated with a functional layer; the pressure-sensitive adhesive layer is on the outside here, so as to result in a double-sided adhesive tape. The functional layer accordingly faces the polyurethane-based carrier according to the invention.

The functional layer here is preferably defined as described above as a constituent of the adhesive tape according to the invention.

Preferred embodiments of the adhesive tapes and processes for production thereof can be found in the dependent claims. The preferred embodiments of the adhesive tapes are additionally also preferred embodiments of the processes for production thereof.

The invention also relates to the use of an adhesive tape according to the invention for bonding of components in electronic, optical or precision mechanical devices, and especially for bonding of windows or lenses in housings of precision mechanical, optical and/or electronic devices.

Typical finished forms of the adhesive tapes according to the invention are adhesive tape rolls—the adhesive tapes, especially in elongate sheet form, can be produced in the form of rolls, i.e. rolled up in the form of Archimedean spirals—and adhesive strips as obtained, for example, in the form of diecuts.

Preferably, all layers are essentially in the shape of a cuboid. Further preferably, all layers are bonded to one another over the full area.

The general expression "adhesive tape", or else synonymously "adhesive strips", in the context of this invention, encompasses all sheetlike structures such as films or film sections extending in two dimensions, tapes having extended length and limited width, tape sections and the like, and lastly also die-cut parts or labels.

The adhesive tapes thus have a longitudinal extent (x direction) and a lateral extent (y direction). The adhesive tapes also have a thickness (z direction) that runs perpendicular to the two extents, the lateral extent and longitudinal extent being several times greater than the thickness. The thickness is very substantially the same, preferably exactly the same, over the entire areal extent of the adhesive tapes determined by their length and width.

The adhesive tapes according to the invention are especially in elongate sheet form. An elongate sheet is understood to mean an object, the length of which (extent in the x direction) is several times greater than its width (extent in the y direction), and the width over the entire length remains roughly and preferably exactly the same.

In double-sided adhesive tapes, the two pressure-sensitive adhesive layers are preferably identical in terms of their composition. Alternatively, they may also differ with regard to their composition. The two pressure-sensitive adhesive layers preferably also have the same thickness in double-sided adhesive tapes. Alternatively, they may also differ with regard to their thickness.

Advantageously, the outer, exposed faces of the pressure-sensitive adhesive layers of the adhesive tapes according to the invention can be provided with anti-adhesive materials, such as a release paper or a release film, also called liner. A liner may also be a material having anti-adhesive coating on at least one side, preferably on both sides, for example double-sidedly siliconized material. A liner, or in more general terms a temporary carrier, is not part of an adhesive tape, but merely an auxiliary for production and/or storage thereof and/or for further processing by die-cutting. Furthermore, a liner, as opposed to a permanent carrier, is not firmly bonded to an adhesive layer, but rather functions as a temporary carrier, i.e. as a carrier that can be pulled away from the adhesive layer. "Permanent carriers" are also referred to synonymously simply as "carriers" in the present application.

Since the adhesive tapes according to the invention comprise pressure-sensitive adhesives, the adhesive tapes according to the invention are also referred to as pressure-sensitive adhesive tapes.

Carrier According to the Invention:

The (thermoplastic) polyurethane for the carriers of the adhesive tapes according to the invention is preferably uncrosslinked. In the context of the present application, uncrosslinked polyurethane means a polyurethane that has not been covalently crosslinked, i.e. not chemically crosslinked. In an uncrosslinked polyurethane, in the context of the present application, however, there may independently be other types of crosslinking, for example coordinate crosslinks, hydrogen bonds, interloops and/or physical crosslinks via crystals, if the polyurethane is semicrystalline. In a preferred embodiment, a pressure-sensitive adhesive layer consisting of a pressure-sensitive adhesive based on vinylaromatic block copolymer, such as styrene block copolymer in particular, is disposed on at least one side, preferably both sides, of the uncrosslinked carrier. Likewise preferably disposed on at least one side, preferably both sides, of the uncrosslinked carrier, is a pressure-sensitive adhesive layer consisting of a polyacrylic-based pressure-sensitive adhesive. In a further preferred embodiment, a pressure-sensitive adhesive layer consisting of a pressure-sensitive adhesive based on a blend of (i) polyacrylate and (ii) vinylaromatic block copolymer essentially immiscible with the polyacrylate, such as styrene block copolymer in particular, is disposed on at least one side, preferably both sides, of the uncrosslinked carrier, where the blend preferably consists to an extent of 50% to 90% by weight, more preferably 65% to 80% by weight, of the polyacrylate, and to an extent of 10% to 50% by weight, preferably 20% to 35% by weight, of vinylaromatic block copolymer.

In an alternative embodiment, the (thermoplastic) polyurethane of the carriers is crosslinked, i.e. covalently crosslinked. This leads especially to improved thermal shear stability of the adhesive tapes. Crosslinking is preferably effected with polyfunctionalized isocyanate compounds. In a preferred embodiment, a pressure-sensitive adhesive layer consisting of a pressure-sensitive adhesive based on vinylaromatic block copolymer, such as styrene block copolymer in particular, is disposed on at least one side, preferably both sides, of the crosslinked carrier. Likewise preferably disposed on at least one side, preferably both sides, of the crosslinked carrier, is a pressure-sensitive adhesive layer consisting of a polyacrylic-based pressure-sensitive adhesive. In a further preferred embodiment, a pressure-sensitive adhesive layer consisting of a pressure-sensitive adhesive based on a blend of (i) polyacrylate and (ii) vinylaromatic block copolymer essentially immiscible with the polyacrylate, such as styrene block copolymer in particular, is disposed on at least one side, preferably both sides, of the crosslinked carrier, where the blend preferably consists to an extent of 50% to 90% by weight, more preferably 65% to 80% by weight, of the polyacrylate, and to an extent of 10% to 50% by weight, preferably 20% to 35% by weight, of vinylaromatic block copolymer.

In a preferred embodiment, the carrier consists of the at least one layer based on polyurethane (that has been produced by means of extrusion or from dispersion); more preferably, the carrier consists of exactly one such layer.

a) Carrier Based on Thermoplastic Polyurethane, Produced by Means of Extrusion:

As described above, the adhesive tape, in one embodiment, comprises a carrier of thickness from 20 to 250 μm, preferably 50 to 150 μm, comprising at least one layer based on preferably uncrosslinked thermoplastic polyurethane that has been produced by means of extrusion, where the polyurethane is based on aromatic polyisocyanate, such as aromatic diisocyanate in particular.

In the present application, a polyurethane based on aromatic polyisocyanate typically means a polyurethane in the preparation of which the isocyanate component used consists to an extent of at least 50% by weight, preferably at least 90% by weight, of aromatic polyisocyanate. More preferably, the isocyanate component used consists essentially of aromatic polyisocyanate. According to the present application, a polyisocyanate is an isocyanate compound having at least two NCO groups. More particularly, it has exactly two NCO groups, i.e. is a diisocyanate.

In addition, a layer based on thermoplastic polyurethane typically means a layer having a proportion of thermoplastic polyurethane of at least 50% by weight. The proportion of thermoplastic polyurethane in the layer is preferably at least 90% by weight; the layer especially consists essentially of thermoplastic polyurethane.

The carrier based on thermoplastic polyurethane and produced by means extrusion contains, based in each case on the total mass of the carrier, preferably (a total of) less than 0.3% by weight, more preferably less than 0.1% by weight, of processing auxiliaries such as waxes, lubricants and/or antiblocking agents (for example $SiO_2$ particles), where the carrier is especially free of processing auxiliaries. The aforementioned proportions by weight of processing auxiliary each mean the total amount of processing auxiliary in the carrier, based on the total mass of the carrier. In a further preferred embodiment, less than 0.1% by weight of waxes, less than 0.1% by weight of lubricant and/or less than 0.1% by weight of antiblocking agent is present in the carrier based on (i) thermoplastic polymer, based in each case on the total mass of the carrier. According to the present application, ageing stabilizers are not considered to be processing auxiliaries.

The layer of the carrier based on thermoplastic polyurethane additionally preferably has a Shore A hardness of not more than 87, more preferably not more than 85 and especially of less than 70. For example, the Shore hardness is between 55 and 70. In an alternatively preferred embodiment, the Shore hardness is between 70 and 85.

The thermoplastic polyurethane for the at least one carrier layer is preferably polyester-based (but may also be polyether-based, for example based on poly-THF as polyol). The thermoplastic polyurethane based on polyester or polyether is typically thermoplastic polyurethane based on aliphatic polyester or aliphatic polyether. The glass transition temperature ($T_g$) of the soft molecular chain of the thermoplastic polyurethane is preferably between −20° C. and 40° C., and the glass transition temperature of the hard molecular chain of the thermoplastic polyurethane is preferably between 6° and 110° C. The thermoplastic polyurethane typically has a tear strength of more than 20 MPa, preferably more than 35 MPa, and the Shore A hardness is preferably between 55 and 85, such as, in particular, between 55 and 70. In an alternatively preferred embodiment, the Shore hardness is between 70 and 85.

The thermoplastic polyurethane is preferably a reaction product of a reaction mixture comprising at least one diisocyanate, at least one polyester polyol (or polyether polyol) and optionally at least one chain extender, where the polyester polyol (or polyether polyol) typically has a melting temperature of at least 30° C., for example at least 100° C. or at least 200° C. The choice of a suitable melting temperature may contribute to an increase in the level of crystallinity of the layer. The level of crystallinity can be determined by differential scanning calorimetry (DSC), and is expressed as the fraction of crystallinity in the thermoplastic polyurethane film.

The proportion of diisocyanate in the reaction mixture is preferably 0.5% to 47% by weight, more preferably 1% to 40% by weight and especially 10% to 25% by weight. The amount of the diisocyanate in the reaction mixture may also be expressed as the isocyanate index. An isocyanate index may generally be understood such that it relates to the ratio of the equivalent amount of functional isocyanate groups used to the equivalent amount of functional hydroxyl groups. The isocyanate index of the reaction mixture is preferably within a range from 0.99 to 1.20, such as 1.00 to 1.10.

The diisocyanate is preferably a diisocyanate having the structure from formula I (Formula I)

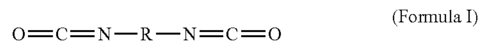

in which R is selected from substituted or unsubstituted ($C_1$-$C_{40}$)-alkylene, ($C_2$-$C_{40}$)-alkenylene, ($C_4$-$C_{20}$)-arylene, ($C_4$-$C_{20}$)-arylene-($C_1$-$C_{40}$)-alkylene-($C_4$-$C_{20}$)-arylene, ($C_4$-$C_{20}$)-cycloalkylene and ($C_4$-$C_{20}$)-aralkylene. In further examples, the diisocyanate is selected from dicyclohexylmethane 4,4'-diisocyanate, isophorone diisocyanate, hexamethylene diisocyanate, phenylene 1,4-diisocyanate, phenylene 1,3-diisocyanate, m-xylylene diisocyanate, tolylene 2,4-diisocyanate, toluene 2,4-diisocyanate, tolylene 2,6-diisocyanate, poly(hexamethylene diisocyanate), cyclohexylene 1,4-diisocyanate, 4-chloro-6-methylphenylene 1,3-diisocyanate, hexamethylene diisocyanate, diphenylmethane 4,4'-diisocyanate, 1,4-diisocyanatobutane, 1,8-diisocyanatooctane, toluene 2,6-diisocyanate, toluene 2,5-diisocyanate, toluene 2,4-diisocyanate, m-phenylene diisocyanate, p-phenylene diisocyanate, methylenebis(o-chlorophenyl diisocyanate), methylene diphenylene 4,4'-diisocyanate, (4,4'-diisocyanato-3,3',5,5'-tetraethyl)diphenylmethane, 4,4'-diisocyanato-3,3'-dimethoxybiphenyl (o-dianisidine diisocyanate), 5-chlorotoluene 2,4-diisocyanate, 1-chloromethyl-2,4-diisocyanatobenzene, tetramethyl-m-xylylene diisocyanate, 1,6-diisocyanatohexane, 1,12-diisocyanatododecane, 2-methyl-1,5-diisocyanatopentane, methylene dicyclohexylene 4,4'-diisocyanate, 3-isocyanatomethyl-3,5,5-trimethylcyclohexyl isocyanate, 2,2,4-trimethylhexyl diisocyanate or a mixture thereof, where, according to the invention, the diisocyanate typically consists to an extent of at least 50% by weight, preferably at least 90% by weight, of aromatic polyisocyanate. Particularly preferred diisocyanates used are diphenylmethane 4,4'-diisocyanate (MDI), hexane diisocyanate (HDI), isophorone diisocyanate (IPDI) and hexamethylene diisocyanate (HMDI), such as MDI in particular.

The proportion of polyester polyol (or polyether polyol) in the reaction mixture is preferably in the range from 43% by weight to 70% by weight, preferably 50% by weight to 60% by weight.

The polyester polyol may contain any suitable number of hydroxyl groups. For example, the polyester polyol may contain four hydroxyl groups or three hydroxyl groups. The polyester polyol may even contain two hydroxyl groups, such that the polyester polyol is a polyester diol. In general, the polyester polyol may be a product of a condensation reaction, such as a polycondensation reaction. However, the polyester polyol is typically not produced via a ring-opening polymerization reaction product.

In examples in which polyester polyol is prepared by a condensation reaction, the reaction between one or more carboxylic acids and one or more polyols may take place. One example of a suitable carboxylic acid comprises a carboxylic acid of formula II having the structure:

(Formula II)

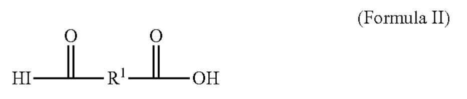

In the formula II, $R^1$ is selected from substituted or unsubstituted ($C_1$-$C_{40}$)-alkylene, ($C_2$-$C_{40}$)-alkylene, ($C_2$-$C_{40}$)-alkenylene, ($C_4$-$C_{20}$)-arylene, ($C_4$-$C_{20}$)-cycloalkylene and ($C_4$-$C_{20}$)-aralkylene. Examples of suitable carboxylic acids include glycolic acid (2-hydroxyethanoic acid), lactic acid (2-hydroxypropanoic acid), succinic acid (butanedioic acid), 3-hydroxybutanoic acid, 3-hydroxypentanoic acid, terephthalic acid (benzene-1,4-dicarboxylic acid), naphthalenedicarboxylic acid, 4-hydroxybenzoic acid, 6-hydroxynaphtalene-2-carboxylic acid, oxalic acid, malonic acid (propanedioic acid), adipic acid (hexanedioic acid), pimelic acid (heptanedioic acid), ethoic acid, suberic acid (octanedioic acid), azelaic acid (nonanedioic acid), sebacic acid (decanedioic acid), glutaric acid (pentanedioic acid), dodecanedioic acid, brassylic acid, thapsic acid, maleic acid, fumaric acid, glutaconic acid, 2-decenoic acid, muconic acid, glutinic acid, citraconic acid, mesaconic acid, itaconic acid, malic acid (2-hydroxybutanedioic acid), aspartic acid (2-aminobutanedioic acid), glutamic acid (2-aminopentanedioic acid), tartaric acid (2,3-dihydroxybutanedioic acid), diaminopimelic acid, saccharic acid, mesoxalic acid, oxaloacetic acid, acetonecarboxylic acid (3-oxopentanedioic acid), arabinaric acid, phthalic acid, isophthalic acid, 2,6-naphthalenedicarboxylic acid or a mixture thereof. Adipic acid is particularly preferred.

One example of a suitable polyol comprises a polyol of formula III having the structure:

(Formula III)

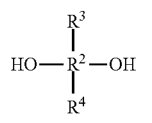

In the formula III, $R^2$ is selected from substituted or unsubstituted ($C_1$-$C_{40}$)-alkylene, ($C_2$-$C_{40}$)-alkenylene, ($C_4$-$C_{20}$)-arylene, ($C_1$-$C_{40}$)-acylene, ($C_4$-$C_{20}$)-cycloalkylene, ($C_4$-$C_{20}$) aralkylene and ($C_1$-$C_{40}$)-alkoxylene, and $R^3$ and $R^4$ are independently selected from —H, —OH, substituted or unsubstituted ($C_1$-$C_{40}$)-alkyl, ($C_2$-$C_{40}$)-alkenyl, ($C_4$-$C_{20}$)-aryl, ($C_1$-$C_{20}$)-acyl, ($C_4$-$C_{20}$)-cycloalkyl, ($C_4$-$C_{20}$) aralkyl and ($C_1$-$C_{40}$)-alkoxy. The polymer used is more preferably ethylene glycol, butanediol, hexanediol, neopentyl glycol or a mixture thereof.

If a chain extender is used, it is preferably present in the reaction mixture in an amount of 1% to 13% by weight, especially 2% to 10% by weight.

The diol chain extender typically has a weight-average molecular weight of less than about 250 daltons. For example, a weight-average molecular weight of the diol chain extender may be within a range from 30 daltons to 250 daltons, preferably 50 daltons to 150 daltons. The diol chain extender may contain any suitable number of carbons. For example, the diol chain extender may have a number-average number of 2 carbon atoms to 20 carbon atoms, preferably 3 carbon atoms to 10 carbon atoms. Such diol chain extenders may contribute to strengthening the TPU-based layer ("TPU" or "PU" in the present application mean "thermoplastic polyurethane" and "polyurethane" respectively). This may be because the relatively short chains can be stiffer than a longer-chain diol. The short-chain diols may be stiffer, for example, because the short-chain diol is more restricted in terms of rotation about the individual bonds along the chain. Examples of suitable diol chain extenders include ethylene glycol, diethylene glycol, triethylene glycol, tetraethylene glycol, propylene glycol, dipropylene glycol, tripropylene glycol, propane-1,3-diol, butane-1,3-diol, butane-1,4-diol, neopentyl glycol, hexane-1,6-diol, cyclohexane-1,4-dimethanol or a mixture thereof. The diol chain extender used is more preferably butanediol.

Particularly preferred polyester polyols are accordingly polyalkylene adipates.

The TPU-based carrier layer that has been produced by means of extrusion is preferably free of additives such as antiblocking agents and waxes. In addition, the thermoplastic polyurethane preferably does not have a crystalline superstructure (a crystalline superstructure is manifested in a DSC peak >210° C.).

In a preferred embodiment, the TPU-based carrier layer is foamed. The foaming is preferably effected with microballoons. Alternatively, it is also possible to use chemical and/or physical blowing agents. The details relating to foaming that follow with regard to the carrier based on preferably uncrosslinked (ii) polyurethane produced from a dispersion are analogously applicable to the (i) TPU-based carrier produced by means of extrusion.

The carrier layer may be opaque, optically clear or transparent.

The main process used for film production is conventionally the blown film process for multiple layers. A PE layer, i.e. the polyethylene layer, and the actual TPU layer are produced here as a coextruded film in the blown film process (in other words, the PE layer functions as support carrier that imparts the necessary mechanical stability to the extrudate). The PE support carrier is thus removed in the application prior to the production of the adhesive tape, i.e. constitutes a temporary carrier. For production of a corresponding blown film, however, numerous additives such as what are called antiblocking agents (e.g. silicate particles) and lubricant waxes are needed to prevent blocking of the PU film when the bubble collapses in the blown film process. The problem here is that TPUs are still tacky about 1 h after melting. Both facts (crystalline superstructure and additives, in particular silicate particles) lead to an adverse effect on mechanical properties. Both the silicate particles in the film (=defects) and a crystalline superstructure (hard inflexible domains) lead to a higher tendency to breaks. The waxes additionally lead to problems with reduction of adhesive force (through migration of the waxes to the PSA surface, i.e. the surface of the pressure sensitive adhesive), and to difficulties in the anchoring of the PSA on the film. An additional advantageous factor for a low tendency to breaks is a high molecular weight of the polyurethane polymer (increase in the toughness of the film).

b) Polyurethane-Based Carrier Produced from Dispersion:

In an alternative embodiment, the adhesive tape comprises at least one carrier having a thickness of 20 to 250 μm, preferably 50 to 150 μm, and containing at least one layer based on preferably uncrosslinked polyurethane that has been produced from a preferably anionically stabilized dispersion. The polyurethane is typically thermoplastic. Such a layer based on polyurethane typically means a layer having a proportion of polyurethane of at least 50% by weight. The proportion of polyurethane in the layer is preferably at least 90% by weight.

Likewise preferably present in the carrier based on polyurethane are less than 0.1% by weight of waxes, less than 0.1% by weight of lubricant and/or less than 0, 1% by weight of antiblocking agent, based in each case on the total mass of the carrier.

The layer based on polyurethane preferably additionally has a modulus at 100% elongation of not more than 1.8 MPa, preferably not more than 1.5 MPa.

The polyurethane (of the PU dispersion used) is especially composed of at least one polyisocyanate component and at least one polyol component, i.e. the reaction product of at least the components mentioned.

Polyurethane dispersions used in the context of the present invention can especially include the following dispersions, optionally in combination:

a) anionically stabilized aliphatic polyester polyurethane dispersions (dispersions based on polyester and aliphatic anionic isocyanate polyurethane). These include the following products that are sold by Covestro AG: Impranil® LP RSC 1380, DL 1537 XP, DL 1554 XP.

b) anionically stabilized aliphatic polyether polyurethane dispersions. These include the following products that are sold by Covestro AG: Impranil® 25 LP DSB 1069.

c) anionically stabilized aliphatic polycarbonate polyester polyurethane dispersions. These include the following products that are sold by Covestro AG: Impranil® DLU.

d) anionically stabilized polycarbonate polyurethane dispersions. These include the following products that are sold by Covestro AG: Impranil® DL 2288 XP.

The polyurethane dispersions are those having a high solids content (about 30% to 70% by weight, preferably 50% to 60% by weight). All products mentioned above under a) to d) are free of organic cosolvents.

The polyurethane here is more preferably aliphatic polyester polyurethane or aliphatic polyether polyurethane, i.e. the polyurethane in this case is based on aliphatic polyester or aliphatic polyether.

The polyurethane dispersions of the present invention are aqueous. They are preferably free of organic solvents, but may optionally contain organic solvents.

The at least one polyisocyanate component is preferably a diisocyanate. Aromatic diisocyanates may be used, such as toluene diisocyanate (TDI) (particularly preferred), p-phenylene diisocyanate (PPDI), diphenylmethane 4,4'-diisocyanate (MDI), bisphenyl p,p'-diisocyanate (BPDI), or especially aliphatic diisocyanates, such as isophorone diisocyanate (IPDI), hexamethylene 1,6-diisocyanate (HDI) or 4,4'-disocyanatodicyclohexylmethane (H12MDI). Likewise useful are diisocyanates having substituents in the form of halo, nitro, cyano, alkyl, alkoxy, haloalkyl, hydroxyl, carboxyl, amido, amino or combinations thereof.

Overall, it is possible to use all aliphatic, cycloaliphatic, araliphatic and preferably aromatic polyfunctional isocyanates that are known per se.

Specific examples include the following: alkenylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates such as cyclohexane 1,3-diisocyanate and cyclohexane 1,4-diisocyanate and any mixtures of these isomers, 1-isocyanato-3,3,5-trimethyl-5-isocyanatomethylcyclohexane (isophorone diisocyanate), 2,4- and 2,6 hexahydrotolylene diisocyanate and any mixtures of these isomers, dicyclohexylmethane 4,4'-, 2,4'- and 2,2'-diisocyanate and any mixtures of these isomers, and preferably aromatic di- and polyisocyanates, for example tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenyl polymethylene polyisocyanates, mixtures of diphenylmethane 4,4'-, 2,4'- and 2,2'-diisocyanates and polyphenyl polymethylene polyisocyanates (crude MDI) and mixtures of crude MDI and tolylene diisocyanates. The organic di- and polyisocyanates may be used individually or in the form of mixtures thereof.

The polyisocyanate component preferably has a number-average molecular weight of 60 to 50 000 g/mol, especially 400 to 10 000 g/mol, preferably of 400 to 6000 g/mol.

Also frequently used are what are called modified polyfunctional isocyanates, i.e. products that are obtained by chemical reaction of organic di- and/or polyisocyanates. Examples include di- and/or polyisocyanates containing ester, urea, biuret, allophanate, carbodiimide, isocyanurate, uretdione and/or urethane groups. Specific examples include: organic, preferably aromatic, polyisocyanates containing urethane groups and having NCO contents of 33.6% to 15% by weight, preferably 31% to 21% by weight, based on the total weight. Examples are low molecular weight diols, triols, dialkylene glycols, trialkylene glycols or polyoxyalkylene glycols having number-average molecular weights up to 6000 g/mol, especially up to 1500 g/mol, modified crude MDI or tolylene 2,4- or 2,6-diisocyanate. Examples of suitable di- or polyoxyalkylene glycols are diethylene glycols, triols and/or tetraols, dipropylene glycols, triols and/or tetraols, polyoxyethylene glycols, triols and/or tetraols, polyoxypropylene glycols, triols and/or tetraols, and polyoxypropylene-polyoxyethylene glycols, triols and/or tetraols. Also suitable are prepolymers containing NCO groups and having NCO contents of 25% to 3.5% by weight, preferably of 21% to 14% by weight, based on the total weight, prepared from polyester polyols and/or preferably polyether polyols, and diphenylmethane 4,4'-diisocyanate, mixtures of diphenylmethane 2,4'- and 4,4'-diisocyanate, tolylene 2,4- and/or 2,6-diisocyanate or crude MDI. Other useful starting materials have been found to be liquid polyisocyanates containing carbodiimide groups and/or isocyanurate rings and having NCO contents of 33.6% to 15% by weight, preferably 31% to 21% by weight, based on the total weight, for example based on diphenylmethane 4,4'-, 2,4'- and/or 2,2'-diisocyanate and/or tolylene 2,4- and/or 2,6-diisocyanate.

The modified polyisocyanates may be mixed with one another or with unmodified organic polyisocyanates, for example diphenylmethane 2,4'-, 4,4'-diisocyanate, crude MDI, tolylene 2,4- and/or 2,6-diisocyanate.

Particularly useful isocyanates have been found to be diphenylmethane diisocyanate isomer mixtures or crude MDI, and especially crude MDI having a diphenylmethane diisocyanate isomer content of 30% to 55% by weight, and polyisocyanate mixtures based on diphenylmethane diisocyanate that contain urethane groups and have an NCO content of 15% to 33% by weight.

Preferred proportions by weight of the polyisocyanate component are from 10% to 40% by weight, especially 13% to 35% by weight and more preferably 15% to 30% by weight.

According to the invention, polyol component means not just polymers having at least two hydroxyl groups but generally compounds having at least two hydrogen atoms that are active toward isocyanates.

The polyol component is preferably a diol, a polyether diol, a polyester diol, a polycarbonate diol, a polycaprolactone polyol or a polyacrylate polyol, particular preference being given to polyether diol, polyester diol and polycarbonate diol, especially glycol, propanediol, butanediol, pentanediol, hexanediol, cyclohexanediol, cyclohexyldimethanol, octanediol, neopentyl glycol, diethylene glycol, triethylene glycol, trimethylpentanediol, benzenedimethanol, benzenediol, methylbenzenediol, bisphenol A, poly(butanediol-co-adipate) glycol, poly(hexanediol-co-adipate) glycol, poly(ethanediol-co-adipate) glycol, polytetramethylene glycol, polypropylene glycol, polyethylene glycol, or a mixture thereof.

The main function of the polyol component is to react with the polyisocyanate component to give the polyurethane polymer. In addition, however, the polyol component also serves as a physical conditioner, since the elasticity of the polyurethane depends on the molecular weight of the polyol component. In general, the higher the molecular weight of the polyol component, the softer the resulting polyurethane.

The polyol component preferably has a number-average molecular weight of 60 to 50 000 g/mol, especially 400 to 10 000 g/mol, preferably of 400 to 6000 g/mol.

For adjustment of the properties of the polyurethane carrier to be produced, it may be advantageous for the starting mixture to additionally comprise at least one further dispersion, typically selected from the group consisting of polyurethane dispersions, polyurethane dispersions wherein the polyol component includes a comonomer having flame-retardant action, synthetic dispersions, natural rubber dispersions and polyacrylate dispersions. In this way, it is possible to improve the stability of the polyurethane carrier inter alia.

Polyacrylate dispersions comprise water-insoluble polyacrylate, which is typically dispersed in water by means of an emulsifier. They contain, for example, about 30% to 60% by weight of polyacrylate and about 3% by weight of emulsifier. According to the invention, the polyacrylate is a water-soluble polyacrylate or polymethacrylate, a mixture thereof or a copolymer with other monomers. The emulsifier may be an ionic, nonionic or steric emulsifier. This is normally not fixedly incorporated into the polymer chains. Acrylate dispersions may comprise further additives, such as film formers or cosolvents, defoamers, flame retardants and/or wetting agents.

Acrylate dispersions are typically obtained by the emulsion polymerization of suitable monomers. For this purpose, these are finely distributed in water by means of an emulsifier. A water-soluble free-radical initiator is added to the emulsion of the monomers in water. Since the free radicals formed therefrom dissolve preferentially in water, the concentration thereof in the monomer droplets is low, and so the polymerization can proceed very uniformly therein. After the polymerization has ended, the dispersion can be used directly, but it is often admixed with additives such as defoamers, film formers and/or wetting agents in order to further improve the properties.

It is optionally possible to catalyse the reaction of the OH groups of the polyol component with the isocyanate groups. Useful catalysts include, in particular:

organic metal compounds, preferably organic tin compounds, such as tin(II) salts of organic carboxylic acids, for example tin(II) acetate, tin(II) octoate, tin(II) ethylhexanoate, tin(II) laurate and dialkyltin(IV) salts of organic carboxylic acids, for example dibutyltin diacetate, dibutyltin dilaurate, dibutyltin maleate, dioctyltin diacetate and tertiary amines such as triethylamine, tributylamine, dimethylcyclohexylamine, dimethylbenzylamine, N-methylimidazole, N-methyl-, N-ethyl-, N-cyclohexylmorpholine, N,N,N',N'-tetramethylethylethylenediamine, N,N,N',N'-tetramethylbutylenediamine, N,N,N',N'-tetramethylhexylene-1,6-diamine, pentamethyldiethylenetriamine, tetramethyldiaminoethyl ether, bis(dimethylaminopropyl)urea, dimethylpiperazine, 1,2-dimethylimidazole, 1-azabicyclo-[3.3.0]-octane, 1,4-diazabicyclo-[2.2.2]-octane, and also alkanolamine compounds such as triethanolamine, trisisopropanolamine, N-methyl- and N-ethyldiethanolamine and dimethylethanolamine.

Useful catalysts further include: tris-(dialkylamino)-s-hexahydrotriazines, especially tris(N,N-dimethylamino)-s-hexahydrotriazine, tetraalkylammonium salts, for example N,N,N-trimethyl-N-(2-hydroxypropyl) formate, N,N,N-trimethyl-N-(2-hydroxypropyl) 2-ethylhexanoate, tetraalkylammonium hydroxides such as tetramethylammonium hydroxide, alkali metal hydroxides such as sodium hydroxide, alkali metal alkoxides such as sodium methoxide and potassium isopropoxide, and alkali metal or alkaline earth metal salts of fatty acids having 1 to 20 carbon atoms and optionally pendant OH groups.

Preference is given to using tertiary amines, tin compounds, alkali metal and alkaline earth metal carboxylates, quaternary ammonium salts, s-hexahydrotriazines and tris (dialkylaminomethyl) phenols.

Preferably 0.001% to 5% by weight, especially 0.002% to 2% by weight, of catalyst or catalyst combination is used, based on the total weight of the starting mixture.

The polyurethane may optionally include an active hydrogen-containing component that can form a hydrophilic group, preferably from 1% to 15% by weight, especially from 3% to 10% by weight and more preferably from 4% to 7% by weight. What is meant here by "active hydrogen" is that the hydrogen atom of the component is unstable in that it can readily enter into a chemical reaction, for example a substitution reaction, with other compounds, so as to be able to form a hydrophilic group. The effect of this component is that the polyurethane can be efficiently dispersed in water. Useful hydrophilic groups especially include: —COO—, $—SO_3^-$, $—NR_3^+$, or $—(CH_2CH_2O)_n—$. The component containing an active hydrogen may be, for example: dimethylolpropionic acid (DMPA), dimethylolbutyric acid (DMBA), poly(ethylene oxide) glycol, bis(hydroxylethyl) amines, or sodium 3-bis(hydroxyethyl)aminopropanesulfonate.

The component containing an active hydrogen is optional, as described above. For the purpose of dispersion, the polyurethane dispersion alternatively or additionally frequently contains at least one surfactant.

Particularly suitable surfactants that also act as foam stabilizer especially include Stokal® STA (ammonium stearate) and Stokal® SR (succinamate) from Bozzetto Group.

However, further surfactants are also useful, which may especially be selected from the group consisting of ether sulfates, fatty alcohol sulfates, sarcosinates, organic amine oxides, sulfonates, betaines, amides of organic acids, sulfosuccinates, sulfonic acids, alkanolamides, ethoxylated fatty alcohols, sorbinates and combinations thereof.

As a further optional component, the starting mixture may comprise a thickener. It is possible here to use Borchi® Gel 0625 for example. Further suitable thickeners are polyetherurethane solutions, for example Ortegol PV301 from Evonik Industries. A thickener especially ensures stability on drying.

The starting mixture may comprise further additives such as stabilizers or light stabilizers. Solvents may also be added as further additives, in which case the proportion of the solvent may be up to 50% by weight, based on the total amount of the finished starting mixture. Suitable customary solvents for preparation of polyurethane materials are solvents such as low-boiling hydrocarbons having boiling points below 100° C., preferably below 50° C., but also other solvents, for example paraffins, halogenated hydrocarbons, halogenated paraffins, ethers, ketones, alkyl carboxylates, alkyl carbonates or additional liquid flame retardants such as alkyl phosphates, for example triethyl phosphate or tributyl phosphate, halogenated alkyl phosphates, for example tris(2-chloropropyl) phosphate or tris(1,3-dichloropropyl) phosphate, aryl phosphates, for example diphenyl cresyl phosphate, phosphonates, for example diethyl ethanephosphonate. Likewise usable are mixtures of the solvents mentioned.

Further optional additives are cell regulators of the type known per se, such as paraffins or fatty alcohols or dimethylpolysiloxanes, flame retardants, pigments or dyes, stabilizers against ageing and weathering influences, plasticizers, fungistatic and bacteriostatic substances, fillers such as barium sulfate, bentonite, kaolin, glass powder, glass beads, glass fibres, calcium carbonate, kieselguhr, quartz sand, fluoropolymers, thermoplastics, microbeads, expandable graphite, carbon black or suspended chalk or combinations thereof.

In a preferred embodiment, it is likewise possible to add expandable microballoons that are expanded when the carrier composition is dried. Alternatively, it is possible to add pre-expanded microballoons. The remarks that follow with regard to the microballoons as used in preferred pressure-sensitive adhesive layers according to the invention are applicable here analogously. In this way, it is possible to produce polyurethane-based carriers foamed by microballoons, i.e. polyurethane foams.

The present invention also encompasses a process for producing a carrier based on (ii) polyurethane that has been produced from a dispersion, in which the foaming has been achieved by means of frothing. The process typically comprises the following steps:

a) initially charging a polyurethane dispersion as described above and at least one surfactant, and optionally further components, such as further dispersions in particular, to form a starting mixture,
b) mechanically foaming the starting mixture to form a moist polyurethane foam composition, optionally with addition of further components, such as fillers and/or further additives in particular,
c) applying the moist polyurethane foam composition to a surface (typically of a temporary carrier, such as that of a liner in particular, or of a pressure-sensitive adhesive layer),
d) drying the moist polyurethane foam composition to obtain the polyurethane foam.

The polyurethane dispersion can be produced here in the manner described hereinafter:

The at least one polyol component and optionally the active hydrogen-containing component and solvent (e.g. acetone or N-methylpyrrolidone) are introduced into a vessel under a nitrogen atmosphere and stirred—for example with a paddle stirrer. Once the components have been mixed well, the at least one polyisocyanate component is added, and the vessel is heated to about 40 to 90° C. for four to six hours and then cooled down. Once the vessel has cooled down to 30° C. to 50° C., a basic solution, for example triethylamine, is added while stirring and the mixture is neutralized for fifteen to twenty minutes. The mixture is then added to water; it is optionally possible to add a chain extender at this point. The polyurethane dispersion according to the invention is obtained.

For formation of the polyurethane foam, the starting mixture, i.e. the polyurethane dispersion produced as above or in some other way, together with the at least one surfactant, and optionally a solvent and/or the further optional constituents, is mechanically beaten and foamed. It is optionally possible to add a thickener after the beating.

Alternatively, what is produced at first is not a polyurethane dispersion. Instead, a prepolymer dispersion is used, and the prepolymer polymerizes in the course of mechanical beating/foaming to give the polyurethane.

Additionally or alternatively, it is possible to add a physical blowing agent. For example, the starting mixture can be foamed in the presence of a gas such as air, nitrogen or a noble gas, for example helium, neon or argon. Blowing agents may be used individually or as a mixture of various blowing agents. Blowing agents may be selected from a large number of materials including the following: hydrocarbons, ethers and esters, and the like. Typical physical blowing agents have a boiling point in the range from −50° C. to +100° C., and preferably from −50° C. to +50° C. Preferred physical blowing agents include hydrocarbons such as n-pentane, isopentane and cyclopentane, methylene chloride, or any combinations of the aforementioned compounds. Such blowing agents may preferably be used in amounts of 5% by weight to 50% by weight of the reaction mixture, especially of 10% by weight to 30% by weight of the reaction mixture.

Additionally or alternatively, it is likewise possible to add a chemical blowing agent. Chemical blowing agents are substances that eliminate gas only during the processing operation on account of a chemical reaction—usually initiated by supply of heat—and hence enable the creation of a foam structure in the polymer. The cause of the elimination of gas may either be the thermal breakdown of the blowing agent or a chemical reaction of various substances present in the blowing agent. The gas formed is usually $N_2$, $CO_2$ or CO.

Foamed carriers based on polyurethane preferably have a density of 250 kg/$m^3$ to 500 kg/$m^3$, more preferably 350 kg/$m^3$ to 450 kg/$m^3$.

A film may optionally be applied above the foam layer. If it is under tension, the film can limit the thickness of the foam layer. The film may alternatively function merely as cover.

In a further preferred embodiment, the foam can be applied to the temporary carrier, such as liner in particular, or the pressure-sensitive adhesive layer by means of a blade or a knife, which achieves a homogeneous thickness of the foam layer before it is introduced or run into the drying oven. Alternatively, it is also possible to provide rollers in order to adjust the thickness of the foam layer.

Application of the foam layer to the carrier and optional coverage with a film are followed by drying, preferably in a drying oven. Preferred temperatures for drying are from 50° C. to 180° C., preferably from 50° C. to 120° C., especially from 70° C. to 115° C., most preferably from 100° C. to 115° C. The temperature is preferably at least 50° C., especially at least 60° C., preferably at least 70° C., especially at least 80° C., even more preferably at least 90° C., especially at least 100° C., especially at least 110° C., very preferably at least 120° C., especially at least 130° C. In addition, the temperature is preferably at most 180° C., especially at most 170° C., more preferably at most 160° C., especially at most 150° C.

The drying in step d) of the above-specified process sequence is preferably effected in at least two stages, with increasing drying temperature from one step to the next. Unlike when high starting temperatures (e.g. 120° C.) are used in the course of drying, a staged increase in the drying temperature enables homogeneous drying, which leads to a homogeneous distribution of the cell sizes. There is at first relatively homogeneous predrying of the entire foam at lower temperature, and removal of the residual moisture at higher temperature in the further step.

However, it may also be desirable to achieve a cell size that varies over the cross section. In this case, a high drying temperature should be employed from the start. This ensures that the foam dries rapidly at the surface, but remains moist for a long time in the interior, which results in the different cell size distribution over the cross section.

The drying in step d) is more preferably effected in two stages, where the drying temperature in the 1st step is from 50° C. to 100° C., preferably 70° C. to 90° C., especially 80°

C., and the drying temperature in the 2nd step is from 105° C. to 180° C., preferably 110° C. to 150° C., especially 120° C.

The PU-based carrier layer made from dispersion is preferably free of additives such as antiblocking agents and waxes. Likewise preferably, the polyurethane does not have a crystalline superstructure.

The PU-based carrier layer made from dispersion or the adhesive tape comprising this layer is additionally typically subjected to a heat treatment at at least 150° C. in order to optimize tensile strength.

Pressure-Sensitive Adhesives According to the Invention:

In the adhesive tapes according to the invention, a pressure-sensitive adhesive layer is disposed on at least one side, preferably both sides, of the at least one carrier. In the present application, the terms "pressure-sensitive adhesive" and "self-adhesive" and the terms "pressure-sensitively adhesive" and "self-adhesive" are used synonymously.

What is understood in accordance with the invention by a "pressure-sensitive adhesive", as is generally customary, is a substance which is permanently tacky and adhesive-especially at room temperature. It is a characteristic feature of a pressure-sensitive adhesive that it can be applied to a substrate by pressure and adheres there, with no specific definition of the pressure to be expended and the time for which this pressure is applied. In some cases, depending on the exact type of pressure-sensitive adhesive, temperature and air humidity, and the substrate, the application of a brief minimal pressure not exceeding a light touch for a brief moment is sufficient to achieve the adhesion effect; in other cases, even a prolonged period of application of a high pressure may be necessary.

Pressure-sensitive adhesives have particular characteristic viscoelastic properties that lead to permanent tack and adhesiveness. It is a characteristic feature of these that, when they are mechanically deformed, the result is both viscous flow processes and the development of elastic resilience forces. Both processes are in a particular ratio to one another in terms of their respective proportions, depending both on the exact composition, structure and level of crosslinking of the pressure-sensitive adhesive and on the speed and duration of the deformation, and on the temperature.

The viscous flow component is necessary for achievement of adhesion. Only the viscous components caused by macromolecules having relatively high mobility enable good wetting and good adaptation to the substrate to be bonded. A high proportion of viscous flow leads to high pressure-sensitive adhesiveness (also referred to as tack or surface tack) and hence often also to a high bonding force. Highly crosslinked systems, or polymers that are crystalline or solidify in vitreous form, generally have at least only low pressure-sensitive adhesion, if any, for lack of free-flowing components.

The elastic resilience force components are needed for achievement of cohesion. They are caused, for example, by very long-chain and entangled macromolecules that are crosslinked physically or chemically, and enable transmission of the forces that attack an adhesive bond. They have the effect that an adhesive bond can withstand a sustained stress acting thereon, for example in the form of a sustained shear stress, to a sufficient degree over a prolonged period of time.

For more exact description and quantification of the degree of elastic and viscous components and of the relative ratio of the components, it is possible to use the parameters of storage modulus (G') and loss modulus (G") that can be determined by means of dynamic-mechanical analysis (DMA). G' is a measure of the elastic component, G" a measure of the viscous component of a substance. Both parameters are dependent on deformation frequency and temperature.

The parameters can be ascertained with the aid of a rheometer. The material to be examined is subjected here to a sinusoidally oscillating shear stress, for example in a plate-plate arrangement. In the case of shear stress-controlled devices, deformation is measured as a function of time and of the time delay of this deformation with respect to the onset of shear stress. This time delay is referred to as the phase angle d.

The storage modulus G' is defined as follows: $G'=(\tau/\gamma)\cdot\cos(\delta)$ ($\tau$=shear stress, $\gamma$=deformation, $\delta$=phase angle=phase shift between shear stress vector and deformation vector). The definition of the loss modulus G" is: $G'=(\tau/\gamma)\cdot\sin(\delta)$ ($\tau$=shear stress, $\gamma$=deformation, $\sigma$=phase angle=phase shift between shear stress vector and deformation vector).

A substance is generally considered to be pressure-sensitively adhesive and is defined as being pressure-sensitively adhesive for the purposes of the invention when, at room temperature, here by definition at 23° C., G' is at least partly within the range from $10^0$ to $10^1$ rad/sec within the deformation frequency range from $10^3$ to $10^7$ Pa, and when G" is likewise at least partly within this range. What is meant by "partly" is that at least a section of the G' curve is within the window defined by the deformation frequency range from $10^0$ to $10^1$ rad/sec inclusive (abscissa) and the range of G' values from $10^3$ to $10^7$ Pa inclusive (ordinate) This is correspondingly true of G".

The pressure-sensitive adhesive layers of the adhesive tapes according to the invention may be based on polymers of different chemical structure. For example, they may be based on acrylate (co)polymer, silicone (co)polymer, nitrile rubber, i.e. acrylonitrile-butadiene rubber, chemically or physically crosslinked synthetic rubber or a mixture (blend) thereof.

The pressure-sensitive adhesive layers of the adhesive tapes according to the invention are preferably based on vinylaromatic block copolymer, polyacrylate or a blend composed of polyacrylate and vinylaromatic block copolymer, the latter typically being essentially immiscible with the polyacrylate. Such a blend preferably consists to an extent of 50% to 90% by weight, preferably 65% to 80% by weight, of polyacrylate and to an extent of 10% to 50% by weight, preferably 20% to 35% by weight, of vinylaromatic block copolymer (where the two proportions by weight add up to 100% by weight).

What is typically meant by a pressure-sensitive adhesive based on a polymer or a polymer mixture (i.e. a polymer blend) in the present application is that the polymer or polymer mixture constitutes at least 50% by weight of all the polymer components of the pressure-sensitive adhesive, preferably at least 90% by weight. In a particularly preferred embodiment, the polymer or polymer mixture constitutes the sole polymer in the adhesive. Any tackifying resins present in the adhesive are not considered to be polymers in this connection.

In the present application, the terms "acrylate" and "polyacrylate" are used synonymously. Each is understood to mean a polymer originating from a polymerization of (meth) acrylic acid, an ester thereof or mixtures of the aforementioned monomers, and optionally further copolymerizable monomers. The term "(meth)acrylic acid" also includes both acrylic acid and methacrylic acid. The polyacrylates are typically copolymers.

Polyacrylate-based pressure-sensitive adhesives usable for the purposes of the invention are solvent-based acrylate-based adhesives, on an aqueous basis or else in the form of a hotmelt system, for example an acrylate hotmelt-based composition, where the latter may have a K value of at least 20, especially greater than 30, obtainable by concentration of a solution of such a composition to a system processible as a hotmelt. The concentration can take place in appropriately equipped tanks or extruders; preference is particularly given to a vented extruder in the case of associated degassing. An adhesive of this kind is set out in DE 43 13 008 A1, the contents of which are hereby referenced and incorporated into this disclosure and invention. The acrylate hotmelt-based adhesive may have been chemically crosslinked.

An adhesive which is likewise found to be suitable is a low molecular weight hotmelt acrylate pressure-sensitive adhesive, for example acResin® UV from BASF, and acrylate dispersion pressure-sensitive adhesives as obtainable, for example, under the Acronal® trade name from BASF.

In a further embodiment, copolymers used in pressure-sensitive adhesives are those of (meth)acrylic acid and esters thereof having 1 to 25 carbon atoms, maleic acid, fumaric acid and/or itaconic acid and/or esters thereof, substituted (meth)acrylamides, maleic anhydride and other vinyl compounds such as vinyl esters, especially vinyl acetate, vinyl alcohols and/or vinyl ethers. The residual solvent content should be below 1% by weight.

Another preferred embodiment is a pressure-sensitive adhesive comprising a polyacrylate polymer. This is a polymer obtainable by free-radical polymerization of acrylic monomers, which are also understood to mean methacrylic monomers, and optionally further copolymerizable monomers.

According to the invention, it may be a polyacrylate crosslinkable with epoxy groups. Accordingly, monomers or comonomers used may preferably be functional monomers crosslinkable with epoxy groups; monomers employed here especially include monomers having acid groups (particularly carboxylic acid, sulfonic acid or phosphonic acid groups) and/or hydroxyl groups and/or acid anhydride groups and/or epoxy groups and/or amine groups; preference is given to monomers containing carboxylic acid groups. It is especially advantageous when the polyacrylate includes polymerized acrylic acid and/or methacrylic acid. Further monomers which can be used as comonomers for the polyacrylate are, for example, acrylic and/or methacrylic esters having up to 30 carbon atoms, vinyl esters of carboxylic acids having up to 20 carbon atoms, vinylaromatics having up to 20 carbon atoms, ethylenically unsaturated nitriles, vinyl halides, vinyl ethers of alcohols containing 1 to 10 carbon atoms, aliphatic hydrocarbons having 2 to 8 carbon atoms and 1 or 2 double bonds, or mixtures of these monomers.

Preference is given to using a polyacrylate which can be derived from the following monomer composition:

i) acrylic esters and/or methacrylic esters of the following formula

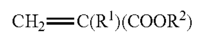

where $R^1$=H or $CH_3$ and $R^2$=H or linear, branched or cyclic, saturated or unsaturated alkyl radicals having 1 to 30 and especially having 4 to 18 carbon atoms, ii) olefinically unsaturated monomers having functional groups of the type already defined for reactivity with epoxy groups, iii) optionally further acrylates and/or methacrylates and/or olefinically unsaturated monomers copolymerizable with component (i).

Further preferably, for use of the polyacrylate as pressure-sensitive adhesive, the proportions of the corresponding components (i), (ii) and (iii) are chosen such that the polymerization product especially has a glass transition temperature of not more than 15° C. (determined by DSC (differential scanning calorimetry) according to DIN 53 765 at a heating rate of 10 K/min).

It is very advantageous for production of the pressure-sensitive adhesives that the monomers of component (i) be chosen with a proportion of 45% to 95% by weight, the monomers of component (ii) with a proportion of 1% to 15% by weight and the monomers of component (iii) with a proportion of 0% to 40% by weight (the figures are based on the monomer mixture for the "base polymer", i.e. without additions of any additives to the finished polymer, such as resins).

The monomers of component (i) are especially plasticizing and/or nonpolar monomers. Preference is given to using, for the monomers (i), acrylic monomers comprising acrylic and methacrylic esters having alkyl groups consisting of 4 to 18 carbon atoms, preferably 4 to 9 carbon atoms. Examples of such monomers are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate and the branched isomers thereof, for example 2-ethylhexyl acrylate or 2-ethylhexyl methacrylate.

Preference is given to using, for component (ii), monomers having those functional groups selected from the following enumeration:

hydroxyl, carboxyl, sulfo or phosphonic acid groups, acid anhydrides, epoxides, amines.

Particularly preferred examples of monomers of component (ii) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

Monomers mentioned by way of example for component (iii) are: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, t-butylphenyl acrylate, t-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofufuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethyl acrylate, methoxy polyethylene glycol methacrylate 350, methoxy polyethylene glycol methacrylate 500, propylene glycol monomethacrylate, butoxy diethylene glycol methacrylate, ethoxy triethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl) acrylamide, N-(n-butoxymethyl) acrylamide, N-(butoxymethyl) methacrylamide, N-(ethoxymethyl) acrylamide, N-(n-octadecyl) acrylamide, and also N,N-dialkyl-substituted amides, for example N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide, acrylonitrile, methacrylonitrile, vinyl ethers such as vinyl methyl ether, ethyl vinyl ether, vinyl isobutyl ether, vinyl esters such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyreneethyl methacrylate (molecular weight $M_w$ of 4000 to 13 000 g/mol), poly(methylmethacrylate)ethyl methacrylate ($M_w$ of 2000 to 8000 g/mol).

Monomers of component (iii) may advantageously also be chosen such that they contain functional groups that assist subsequent radiation-chemical crosslinking (for example by electron beams, UV). Suitable copolymerizable photoinitiators are, for example, benzoin acrylate and acrylate-functionalized benzophenone derivatives. Monomers that assist crosslinking by electron bombardment are, for example tetrahydrofurfuryl acrylate, N-tert-butylacrylamide and allyl acrylate, but this enumeration is not conclusive.

In addition, the composition of the pressure-sensitive adhesive based on polyacrylate (or based on an acrylate blend) often includes epoxy-based crosslinkers. Substances containing epoxy groups that are used are especially polyfunctional epoxides, i.e. those that have at least two epoxy units per molecule (i.e. are at least bifunctional). These may be either aromatic or aliphatic compounds. Epoxy-based crosslinkers may also be used in oligomeric or polymeric form.

The mixture of acrylates may in turn further preferably have the following composition:

(I) 90% to 99% by weight of n-butyl acrylate and/or 2-ethylhexyl acrylate, (II) 1% to 10% by weight of an ethylenically unsaturated monomer having an acid or acid anhydride function, where (I) and (II) preferably add up to 100% by weight.

Preferably, the monomer (I) is composed of a mixture of 2-ethylhexyl acrylate and n-butyl acrylate, further preferably in equal parts.

Useful monomers (II) advantageously include acrylic acid, methacrylic acid, itaconic acid, maleic acid, fumaric acid and/or maleic anhydride, for example.

Preference is given to acrylic acid or methacrylic acid, optionally the mixture of the two.

For achievement of pressure-sensitive adhesive properties, the adhesive should be above its glass transition temperature at the processing temperature in order to have viscoelastic properties. The glass transition temperature of the pressure-sensitive adhesive formulation (polymer-tackifier mixture) is therefore preferably below +15° C. (determined by DSC (differential scanning calorimetry) according to DIN 53 765 at a heating rate of 10 K/min).

The glass transition temperature of the acrylate copolymers can be estimated according to the Fox equation from the glass transition temperatures of the homopolymers and their relative ratios.

To achieve polymers, for example pressure-sensitive adhesives or heat-sealing compositions, having desired glass transition temperatures, the quantitative composition of the monomer mixture is advantageously chosen so as to give the desired $T_G$ for the polymer according to equation (G1) in analogy to the Fox equation (cf. T. G. Fox, Bull. Am. Phys. Soc. 1956, 1, 123).

$$\frac{1}{T_G}\sum_n \frac{w_n}{T_{G,n}}$$

n=serial number over the monomers used, $w_n$=proportion by mass of the respective monomer n (% by weight) and $T_{G,n}$=respective glass transition temperature of the homopolymer formed from the respective monomers n in K.

Analogously, equation G1 can also be employed for determination and prediction of the glass transition temperature of polymer mixtures. In that case, if the mixtures are homogeneous mixtures, n=serial number over the polymers used, $w_n$=proportion by mass of the respective polymer n (% by weight) and $T_{G,n}$=respective glass transition temperature of the polymer n in K.

The possible addition of tackifiers, i.e. tackifying resins, inevitably increases the glass transition temperature, by about 5 to 40 K according to the amount added, compatibility and softening temperature. Preference is therefore given to acrylate copolymers having a glass transition temperature of not more than 0° C.

In a further advantageous execution of the invention, the adhesive has typically been admixed with a second, elastomer-based polymer component that is essentially immiscible with the polyacrylate component (called elastomer component hereinafter), especially one or more synthetic rubbers, such as vinylaromatic block copolymers (e.g. styrene block copolymers).

Preferably, the adhesive in that case comprises at least the following two components:

(P) a first, polyacrylate-based polymer component, (E) a second, elastomer-based polymer component typically essentially immiscible with the polyacrylate component, especially a synthetic rubber (called "elastomer component" hereinafter).

The polyacrylate component P is present more particularly to an extent of 50% by weight to 90% by weight, preferably 65% by weight to 80% by weight, and the elastomer component (E) lies especially to an extent of 10% by weight to 50% by weight, preferably 20% by weight to 35% by weight out, based on the sum total of polyacrylate component (P) and elastomer component (E) as 100% by weight. The overall composition of the adhesive may especially be restricted to these two components, but it is also possible for there to be further, additional components such as additives and the like (in this regard see also further down).

According to the invention, the second polymer component (elastomer component (E)) is typically essentially immiscible with the first polymer component (polymer component (P)), and so the adhesive in the adhesive layer is present in at least two separate phases. More particularly, one phase forms a matrix and the other phase a multitude of domains arranged within the matrix.

Homogeneous mixtures are substances mixed at the molecular level; homogeneous systems are accordingly monophasic systems. The underlying substances are referred to in a synonymous manner in the context of this document as mutually "homogeneously miscible" and "compatible".

Accordingly, two or more components are synonymously "not homogeneously miscible" and "incompatible" when they do not form a homogeneous system after intimate mixing, but at least two phases. Synonymously "partly homogeneously miscible" and "partly compatible" components are regarded as being those which form at least two phases on intimate mixing with one another (for example by shearing, in the melt or in solution and subsequently eliminating the solvent), each of which is rich in one of the components, but one or both of the phases may each include a greater or lesser portion of the other components in a homogeneous mixture.

The polyacrylate component (P) is preferably a homogeneous phase. The elastomer component (E) may be intrinsically homogeneous or itself have intrinsic polyphasicity, as known from microphase-separating block copolymers. In the present context, polyacrylate component and elastomer component are chosen such that-after intimate mixing-they are essentially immiscible at 23° C. (i.e. the customary use temperature for adhesives). "Essentially immiscible" means that the components are either not homogeneously miscible with one another at all, such that none of the phases includes a proportion of the second component in a homogeneous mixture, or that the components are partly compatible with one another only to such a minor degree, i.e. one or both components can homogeneously absorb only such a small proportion of the respective other component, that the partial compatibility is not essential to the invention, i.e. is not detrimental to the teaching of the invention. In that case, the corresponding components are considered in the context of the present invention to be "essentially free" of the respective other component.

The adhesive used in accordance with the invention is accordingly present in at least biphasic morphology at least at room temperature (23° C.). Very preferably, the polyacrylate component (P) and the elastomer component (E) are essentially not homogeneously miscible within a temperature range from 0° C. to 50° C., even more preferably from −30° C. to 80° C.

Components in the context of this document are defined as being "essentially immiscible with one another" especially when the formation of at least two stable phases can be detected physically and/or chemically, where one phase is rich in one component—the polyacrylate component (P)—and the second phase is rich in the other component—the elastomer component (E). An example of a suitable analysis system for a phase separation is scanning electron microscopy. However, phase separation can also be recognized, for example, in that the different phases have two independent glass transition temperatures in dynamic differential calorimetry (DSC). Phase separation exists in accordance with the invention when it can be shown unambiguously by at least one of the analysis methods.

The phase separation may especially be implemented in that there are discrete regions ("domains") that are rich in one component (formed essentially from one of the components and free of the other component) in a continuous matrix rich in the other component (essentially formed from the other component and free of the first component).

The phase separation for the adhesives used in accordance with the invention especially takes place in that the elastomer component (E) is present in dispersed form in a continuous matrix of the polyacrylate component (P). The regions (domains) formed by the elastomer component (E) are preferably in essentially spherical form. The regions (domains) formed by the elastomer component (E) may also depart from spherical form, and especially be distorted, for example elongated and oriented in coating direction. The size of the elastomer domains in their greatest dimension is typically—but not necessarily—between 0.5 μm and 150 μm, especially between 1 μm and 30 μm. Other domain forms are likewise possible, for example in the form of sheets or rods, where these may also depart from ideal structures in terms of their shape and may, for example, be bent or distorted.

The polyacrylate component (P) and the elastomer component (E) each consist of a base polymer component which may be a homopolymer, a copolymer or a mixture of polymers (homopolymers and/or copolymers), and optionally additions (co-components, additives). In simplified form, the base polymer component is referred to hereinafter as "base polymer", but this is not intended to exclude polymer mixtures for the respective base polymer component; correspondingly, "polyacrylate base polymer" is understood to mean the base polymer component of the polyacrylate component and "elastomer base polymer" to mean the base polymer component of the elastomer component of the adhesive.

The polyacrylate component (P) and/or the elastomer component (E) may each be in the form of 100% systems, i.e. based exclusively on their respective base polymer component and without further addition of (tackifying) resins, additives or the like. In a further preferred manner, one or both of these two components have been admixed not only with the base polymer component but also with further components, for example (tackifying) resins.

In an advantageous execution of the invention, the polyacrylate component (P) and the elastomer component (E) are composed exclusively of their respective base polymer components, and so no further polymeric components are present, and especially no resins are present. In a further development, the overall adhesive does not comprise any further constituents apart from the two base polymer components.

The polyacrylate-based adhesive or the polyacrylate component (P) has especially advantageously been admixed with one or more crosslinkers for chemical and/or physical crosslinking. However, since radiation-chemical crosslinking of the polyacrylate component (P) is also possible in principle, crosslinkers are not necessarily present.

Crosslinkers are those compounds—especially bi- or polyfunctional compounds, usually of low molecular weight—which can react under the crosslinking conditions chosen with suitable groups—especially functional groups—of the polymers to be crosslinked, thus join two or more polymers or polymer sites to one another (form "bridges") and hence create a network of the polymer or polymers to be crosslinked. This generally results in an increase in cohesion. The degree of crosslinking depends on the number of bridges formed.

Suitable crosslinkers in the present context are in principle all crosslinker systems that are known to the person skilled in the art for the formation particularly of covalent, coordinated or associative binding systems with appropriately modified (meth)acrylate monomers, according to the nature of the polymers chosen and their functional groups. Examples of chemical crosslinking systems are di- or polyfunctional isocyanates or di- or polyfunctional epoxides or di- or polyfunctional hydroxides or di- or polyfunctional amines or di- or polyfunctional acid anhydrides. Combinations of different crosslinkers are likewise conceivable.

Further suitable crosslinkers include chelate formers which, in combination with acid functionalities in polymer chains, form complexes that act as crosslinking points.

For effective crosslinking, it is especially advantageous when at least some of the polyacrylates have functional groups with which the respective crosslinkers can react. For this purpose, preference is given to using monomers having functional groups selected from the group comprising: hydroxyl, carboxyl, sulfo or phosphonic acid groups, acid anhydrides, epoxides, amines.

Particularly preferred examples of monomers for polyacrylates are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

It has been found to be particularly advantageous to use, as crosslinker, 0.03 to 0.2 part by weight, especially 0.04 to 0.15 part by weight, of N,N,N',N'-tetrakis(2,3-epoxypropyl)-m-xylene-a,a'-diamine (tetraglycidyl-meta-xylenediamine; CAS 63738-22-7), based on 100 parts by weight of polyacrylate base polymer.

Alternatively or additionally, it may be advantageous to crosslink the adhesive by radiation-chemical means. Useful radiation for this purpose includes ultraviolet light (particularly when suitable photoinitiators have been added to the formulation or at least one polymer in the acrylate component contains comonomers having units of photoinitiating functionality) and/or electron beams.

It may be advantageous for radiation-induced crosslinking when some of the monomers used contain functional groups which assist subsequent radiation-chemical crosslinking. Suitable copolymerizable photoinitiators are, for example, benzoin acrylate and acrylate-functionalized benzophenone derivatives. Monomers that assist crosslinking by electron bombardment are, for example, tetrahydrofurfuryl acrylate, N-tert-butylacrylamide and allyl acrylate.

For chemical and/or physical and/or radiation-induced crosslinking, reference is made particularly to the relevant prior art.

For achievement of desired properties of the pressure-sensitive adhesive, for example in order to achieve sufficient cohesion of the pressure-sensitive adhesives, the pressure-sensitive adhesives are generally crosslinked, meaning that the individual macromolecules are joined to one another by bridging bonds. Crosslinking can be accomplished in different ways: for instance, there are physical, chemical or thermal methods of crosslinking.

Crosslinking of polymers refers especially to a reaction in which many macromolecules that are linear or branched at first are joined by formation of bridges between the individual macromolecules to give a more or less branched network. The bridges are especially formed by reaction of suitable chemical molecules—called crosslinkers or crosslinker substances—with the macromolecules, for example with particular functional groups of the macromolecules that are particularly attackable by the respective crosslinker molecule. The sites in the crosslinker molecule that attack the macromolecules are generally referred to as "reactive centres". Crosslinker molecules can join two macromolecules to one another in that one and the same crosslinker molecule reacts with two different macromolecules, i.e. especially has at least two reactive centres, or crosslinker molecules may also have more than two reactive centres, such that one single crosslinker molecule may then also join three or more macromolecules to one another. Intramolecular reactions can occur as a side reaction when one and the same crosslinker molecule attacks one and the same macromolecule with at least two of its reactive centres. In the context of effective crosslinking of the polymer, such side reactions are generally undesirable.

It is possible to distinguish between different types of crosslinkers, namely

1.) covalent crosslinkers, namely those that covalently attack the macromolecules to be joined and hence form a covalent chemical bond between their corresponding reactive centre and the site of attack-especially the functional group-on the macromolecule. Useful chemical reactions in principle include all conceivable chemical reactions that form covalent bonds.

2.) coordinative crosslinkers, namely those that coordinatively attack the macromolecules to be joined and hence form a coordinate bond between their corresponding reactive centre and the site of attack—especially the functional group—on the macromolecule. Useful chemical reactions in principle include all conceivable chemical reactions that form coordinate bonds.

Specific Embodiments of the Pressure-Sensitive Adhesives:

The adhesives of the adhesive tapes according to the invention, in a particularly preferred embodiment of the invention—referred to hereinafter as "specific embodiment", are crosslinkable adhesives especially consisting of (a) at least a first base component comprising (a1) as a first polymer component a base polymer component (also referred to hereinafter as base polymer for short) composed of a homopolymer, a copolymer or a homogeneous mixture of two or more homopolymers, two or more copolymers or one or more homopolymers with one or more copolymers, where at least one of the homopolymers or at least one of the copolymers, especially all the polymers of the base polymer component for the crosslinking have functional groups, (a2) optionally further constituents that are homogeneously miscible with or soluble in the base polymer component, such as resins or additives, monomer residues, short-chain polymerization products (by-products), impurities etc.;

(b) optionally a second component comprising (b1) as a further polymer component polymers that are essentially not homogeneously miscible with the base polymer, especially those having no crosslinkable groups, (b2) optionally further constituents that are essentially not homogeneously miscible with and insoluble in the base polymer, such as particular resins or additives, where component (f) is especially wholly or partly homogeneously miscible with the further polymer component (b) optionally present;

(c) crosslinkers, namely (c1) at least one covalent crosslinker, (c2) at least one coordinative crosslinker, and (d) optionally solvents or solvent residues.

The first base component (a) may especially be a polyacrylate component (P) and the second component (b) may especially be an elastomer component (E) within the meaning of the above remarks.

Useful polymers for the base polymer component (a1) for the specific embodiment especially include those polymers and polymer mixtures which can be crosslinked either by covalent or by coordinative crosslinkers. These are especially polymers having free acid groups available for the crosslinking.

Preferred base polymers that can be used are acrylate copolymers, especially those polymers (copolymers, polymer mixtures) that can be derived to an extent of at least 50% by weight from acrylic monomers. Comonomers chosen for the introduction of the crosslinkable groups are copolymerizable monomers having free acid groups, particular preference being given to using acrylic acid. Monomers containing acid groups, for example acrylic acid, have the property of affecting the pressure-sensitive adhesive properties of the pressure-sensitive adhesive. If acrylic acid is used, it is preferably used in a proportion up to a maximum of 12.5% by weight, based on the totality of the monomers of the base polymer component. Depending on the amounts of crosslinker used in each case, the amount of acrylic acid included in the polymer is preferably at least sufficient for there to be enough acid groups to result in essentially complete reaction of the crosslinkers.

For its part, the polyacrylate component (a) of the advantageous pressure-sensitive adhesive of the specific embodiment preferably constitutes a homogeneous phase. The elastomer component (b) may be intrinsically homogeneous or itself have intrinsic polyphasicity, as known from microphase-separating block copolymers. In the present context, polyacrylate component and elastomer component are chosen such that—after intimate mixing-they are essentially immiscible at 23° C. (i.e. the customary use temperature for adhesives). “Essentially immiscible” means that the components are either not homogeneously miscible with one another at all, such that none of the phases includes a proportion of the second component in a homogeneous mixture, or that the components are partly compatible with one another only to such a minor degree—i.e. one or both components can homogeneously absorb only such a small proportion of the respective other component—that the partial compatibility is not essential to the invention, i.e. is not detrimental to the teaching of the invention. In that case, the corresponding components are considered in the context of the present invention to be “essentially free” of the respective other component.

The advantageous adhesive of the specific embodiment is accordingly present in at least biphasic morphology at least at room temperature (23° C.). Very preferably, the polyacrylate component and the elastomer component are essentially not homogeneously miscible within a temperature range from 0° C. to 50° C., even more preferably from −30° C. to 80° C.

The polyacrylate component and/or the elastomer component may each be in the form of 100% systems, i.e. based exclusively on their respective polymer component ((a1) or (b1)) and without further addition of resins, additives or the like. In a further preferred manner, one or both of these two components as well as the base polymer component have been admixed with further components, for example resins.

In an advantageous implementation of the specific embodiment, the polyacrylate component and the elastomer component are composed exclusively of their respective polymer component ((a1) or (b1)), such that no further polymeric components are present, especially no resins are present. In one development, the polymer component for the entire adhesive, apart from the two polymer components (a1) and (b1), does not comprise any further constituents (regardless of crosslinkers in the sense of component (c) and any solvents/solvent residues (d) present).

The polyacrylate component (a) of the advantageous adhesive of the specific embodiment especially comprises one or more polyacrylate-based polymers that constitute the base polymer component (a1).

Polyacrylate-based polymers are especially those polymers that can be derived at least predominantly—especially to an extent of more than 60% by weight—from acrylic esters and/or methacrylic acid, and optionally the free acids thereof, as monomers (referred to hereinafter as “acrylic monomers”). Polyacrylates are preferably obtainable by free-radical polymerization.

Polyacrylates may optionally contain further units based on further non-acrylic copolymerizable monomers.

The polyacrylates may be homopolymers and/or especially copolymers. The term “copolymer” in the context of this invention encompasses both those copolymers in which the comonomers used in the polymerization are incorporated in a purely random manner and those in which there are gradients in the comonomer composition and/or local enrichments of individual types of comonomer and entire blocks of a monomer in the polymer chains. Alternating comonomer sequences are also conceivable.

The polyacrylates may, for example, be of linear, branched, star-shaped or grafted structure, and they may be homopolymers or copolymers.

Advantageously, the average molar mass (weight-average MW) of at least one of the polyacrylates of the polyacrylate base polymer, and in the case that multiple polyacrylates are present advantageously the predominant proportion by weight of the polyacrylates, especially of all polyacrylates present, is in the range from 250 000 g/mol to 10 000 000 g/mol, preferably in the range from 500 000 g/mol to 5 000 000 g/mol.

In a very preferred procedure, the crosslinkers of component (c) of the specific embodiment are homogeneously miscible into the base component, optionally after prior dissolution in suitable solvents.

Covalent crosslinkers (component (c1)) used for the specific embodiment are preferably glycidylamines. Examples of crosslinkers that are particularly preferred in accordance with the invention include N,N,N',N'-tetrakis(2,3-epoxypropyl)cyclohexane-1,3-dimethylamine and N,N,N',N'-tetrakis (2,3-epoxypropyl)-m-xylene-a,a'-diamine.

It is advantageously also possible to use polyfunctional epoxides, especially epoxycyclohexyl carboxylates, as covalent crosslinkers. Particular mention should be made here by way of example of 2,2-bis(hydroxymethyl) propane-1,3-diol or (3,4-epoxycyclohexane)methyl 3,4-epoxycyclohexylcarboxylate.

In addition, polyfunctional azeridines may be used in accordance with the invention. One example of these is trimethylolpropane tris(2-methyl-1-aziridinepropionate).

Covalent crosslinkers used may further preferably be isocyanates, especially multifunctional isocyanate compounds. The polyfunctional isocyanate compound used may, for example, be tolylene diisocyanate (TDI), tolylene 2,4-diisocyanate dimer, naphthylene 1,5-diisocyanate (NDI), tolylene o-diisocyanate (TODI), diphenylmethane diisocyanate (MDI), triphenylmethane triisocyanate, tris(p-isocyanatophenyl) thiophosphite, polymethylene polyphenyl isocyanate. They may be used alone or in a combination of two or more types thereof.

In the specific embodiment, according to the invention, at least one covalent crosslinker is used, but it is also possible to use two or more covalent crosslinkers, for instance the two aforementioned diamine compounds in combination with one another for example.

Useful coordinative crosslinkers (component (c2)) for the specific embodiment especially include chelate compounds, especially polyvalent metal chelate compounds. The term "polyvalent metal chelate compound" is understood to mean those compounds in which a polyvalent metal is coordinatively bound to one or more organic compounds. Polyvalent metal atoms used may be Al(III), Zr(IV), Co(II), Cu(I), Cu(II), Fe(II), Fe(III), Ni(II), V(II), V(III), V(IV), V(V), Zn(II), In(III), Ca(II), Mg(II), Mn(II), Y(III), Ce(II), Ce(IV), St(II), Ba(II), Mo(II), Mo(IV), Mo(VI), La(III), Sn(II) Sn(IV), Ti(IV) and the like. Among these, preference is given to Al(III), Zr(IV) and Ti(IV).

Ligands used for the coordinative crosslinkers in the specific embodiment may in principle be all known ligands. However, the atoms used for the coordinated binding of the organic compound may especially be those atoms that have free electron pairs, for example oxygen atoms, sulfur atoms, nitrogen atoms and the like. The organic compounds used may, for example, be alkyl esters, alcohol compounds, carboxylic acid compounds, ether compounds, ketone compounds and the like. In particular, titanium chelate compounds such as titanium dipropoxide bis(acetylacetonate), titanium dibutoxide bis(octyleneglycolate), titanium dipropoxide bis(ethylacetoacetate), titanium dipropoxide bis(lactate), titanium dipropoxide bis(triethanolaminate), titanium di-n-butoxide bis(triethanolaminate), titanium tri-n-butoxide monostearate, butyl titanate dimer, poly(titanium acetylacetonate) and the like; aluminium chelate compounds such as aluminium diisopropoxide monoethylacetate, aluminium di-n-butoxide monomethylacetoacetate, aluminium di-i-butoxide monomethylacetoacetate, aluminium di-n-butoxide monoethylacetoacetate, aluminium di-sec-butoxide monoethylacetoacetate, aluminium triacetylacetonate, aluminium triethylacetoacetonate, aluminium monoacetylacetonate bis(ethylacetoacetonate) and the like, and zirconium chelate compounds such as zirconium tetraacetylacetonate and the like are listed for illustrative purposes. Among these, preference is given to aluminium triacetylacetonate and aluminium dipropoxide. They may be used alone or in a combination of two or more types thereof.

Covalent crosslinkers (c1) are used in the specific embodiment preferably in a total amount of 0.015 to 0.04 and preferably 0.02 to 0.035 part by weight, based on 100 parts by weight of the base polymer component (a1), very preferably in an amount of 0.03% by weight.

Coordinative crosslinkers (c2) are used in the specific embodiment preferably in an amount of 0.03 to 0.15 and preferably 0.04 to 0.1 part by weight, based on 100 parts by weight of the base polymer component (a1).

Further preferably, covalent crosslinkers and coordinative crosslinkers are used in the specific embodiment in such a way that the coordinative crosslinkers are present in a molar excess relative to the covalent crosslinkers. Preference is given to using the crosslinkers within the aforementioned amount ranges, specifically in such a way that the molar ratio of covalent crosslinkers to coordinative crosslinkers—i.e. the ratio of the molar amount $n_{cov}$ of the covalent crosslinkers used to the molar amount $n_{coord}$ of the coordinated crosslinkers used—is in the range from 1:1.3 to 1:4.5; accordingly, $1.3 \leq n_{coord}/n_{cov} \leq 4.5$. A very preferred molar ratio of covalent crosslinkers to coordinated crosslinkers is from 1:2 to 1:4.

Elastomer Component of the Pressure-Sensitive Adhesives (Especially of the Specific Embodiment)

As set out above, the pressure-sensitive adhesive used in accordance with the invention, even in the form of its specific embodiment, may comprise polymers that are essentially not homogeneously miscible with the polyacrylate component or the base polymer, especially an elastomer component. For its part, the elastomer component which is essentially incompatible with the polyacrylate component advantageously comprises one or two or more independently selected synthetic rubbers as base polymer component.

The synthetic rubber used is preferably at least one vinylaromatic block copolymer in the form of a block copolymer having an A-B, A-B-A, $(A-B)_n$, $(A-B)_nX$, $(A-B-A)_nX$ or $A-B-X(A'-B')_n$ structure, in which the A or A' blocks are independently a polymer formed by polymerization of at least one vinylaromatic, for example styrene or α-methylstyrene;

the B or B' blocks are independently a polymer formed by polymerization of conjugated dienes having 4 to 18 carbon atoms and/or a polymer formed from an isoprene, butadiene, a farnesene isomer or a mixture of butadiene and isoprene or a mixture of butadiene and styrene, or containing entirely or partially ethylene, propylene, butylene and/or isobutylene, and/or a partly or fully hydrogenated derivative of such a polymer;

X is the radical of a coupling reagent or initiator and n is an integer ≥2.

More particularly, all synthetic rubbers are block copolymers having a structure as detailed above. The synthetic rubber may thus also comprise mixtures of various block copolymers having a construction as above. A-B diblock copolymers are typically not used alone.

Suitable block copolymers (vinylaromatic block copolymers) thus comprise one or more rubber-like blocks B or B' (soft blocks) and one or more glass-like blocks A or A' (hard blocks). Particular preference is given to a block copolymer having an A-B, A-B-A, $(A-B)_3X$ or $(A-B)_4X$ construction, where the above meanings are applicable to A, B and X. Most preferably, all synthetic rubbers are block copolymers having an A-B, A-B-A, $(A-B)_3X$ or $(A-B)_4X$ construction, where the above meanings are applicable to A, B and X. More particularly, the synthetic rubber is a mixture of block copolymers having an A-B, A-B-A, $(AB)_3X$ or $(A-B)_4X$ structure, preferably comprising at least diblock copolymers A-B and/or triblock copolymers A-B-A.

Also advantageous is a mixture of diblock and triblock copolymers and $(A-B)_n$ or $(A-B)_nX$ block copolymers with n not less than 3.

In some advantageous embodiments, a block copolymer which is a multi-arm block copolymer is used additionally or exclusively. This is described by the general formula $$Q_m\text{-}Y$$

in which Q represents one arm of the multi-arm block copolymer and m in turn represents the number of arms, where m is an integer of at least 3. Y is the radical of a multifunctional joining reagent which originates, for example, from a coupling reagent or a multifunctional initiator. More particularly, each arm Q independently has the formula A*-B* where A* and B*, in each case independently of the other arms, are chosen in accordance with the above definitions for A/A' and B/B', such that each A* represents a vitreous block and B* represents a soft block. It will be appreciated that it is also possible to choose identical A* and/or identical B* for multiple arms Q or all arms Q. The blocks A, A' and A* are referred to collectively hereinafter as A blocks. The blocks B, B' and B* are correspondingly referred to collectively hereinafter as B blocks.

A blocks are generally vitreous blocks each having a glass transition temperature above room temperature (room temperature in the context of this invention shall be understood to mean 23° C.). In some advantageous embodiments, the glass transition temperature of the vitreous block is at least 40° C., preferably at least 60° C., even more preferably at least 80° C. or very preferably at least 100° C.

The vinylaromatic block copolymer generally also has one or more rubber-like B blocks having a glass transition temperature less than room temperature. In some embodiments, the $T_g$ of the soft block is less than −30° C. or even less than −60° C.

As well as the inventive and particularly preferred monomers mentioned for the B blocks, further advantageous embodiments include a polymerized conjugated diene, a hydrogenated derivative of a polymerized conjugated diene or a combination thereof. In some embodiments, the conjugated dienes comprise 4 to 18 carbon atoms.

Preferred conjugated dienes as monomers for the soft block B are especially selected from the group consisting of butadiene, isoprene, ethylbutadiene, phenylbutadiene, piperylene, pentadiene, hexadiene, ethylhexadiene and dimethylbutadiene, and any desired mixtures of these monomers. The B block may also be in the form of a homopolymer or copolymer.

Examples of further advantageous conjugated dienes for the B blocks additionally include ethylbutadiene, phenylbutadiene, piperylene, pentadiene, hexadiene, ethylhexadiene and dimethylbutadiene, where the polymerized conjugated dienes may be in the form of a homopolymer or of a copolymer.

More preferably, the conjugated dienes as monomers for the soft block B are selected from butadiene and isoprene. For example, the soft block B is a polyisoprene, a polybutadiene or a partly or fully hydrogenated derivative of one of these two polymers, such as polybutylene-butadiene in particular, or a polymer formed from a mixture of butadiene and isoprene. Most preferably, the B block is a polybutadiene.

The proportion of A blocks based on the overall block copolymers preferably averages 10% to 40% by weight, more preferably 15% to 33% by weight.

A preferred polymer for A blocks is polystyrene. Preferred polymers for B blocks are polybutadiene, polyisoprene, polyfarnesene and the partly or fully hydrogenated derivatives thereof, such as polyethylene-butylene, polyethylene-propylene, polyethylene-ethylene-propylene or polybutylene-butadiene or polyisobutylene. Polybutadiene is very preferred. Mixtures of different block copolymers may be used. Preference is given to using triblock copolymers ABA and/or diblock copolymers AB.

Block copolymers may be linear, radial or star-shaped (multi-arm).

The aforementioned types of vinylaromatic block copolymers are also preferably used in pressure-sensitive adhesives based on vinylaromatic block copolymer.

Further Components of the Pressure-Sensitive Adhesives (Especially of the Specific Embodiment)

The pressure-sensitive adhesives used in accordance with the invention, based on polyacrylate or based on a blend of polyacrylate with synthetic rubber such as vinylaromatic block copolymer, may especially be resin-free since the polyacrylate component is frequently itself already typically pressure-sensitively adhesive, and the pressure-sensitive adhesive character is maintained even when the elastomer component is present. Nevertheless, it may be of interest to further improve the adhesive properties or to optimize them for specific applications; therefore, in an advantageous development of the invention, the adhesives may be admixed with tackifying resins. Pressure-sensitive adhesives based on vinylaromatic block copolymer typically contain tackifying resin.

The use of tackifiers, also referred to as tackifying resins, for increasing the bonding forces of pressure-sensitive adhesives is known in principle. Preferably, 15 to 100 parts by weight of tackifier (based on the polymers, i.e. acrylates plus any elastomers such as synthetic rubbers) are added to the pressure-sensitively adhesive acrylate composition, usually 20 to 80 parts by weight, further preferably 30 to 50 parts by weight.

A "tackifying resin", according to the general understanding of those skilled in the art is understood to mean an oligomeric or polymeric resin that increases autoadhesion (tack, intrinsic tackiness) of the pressure-sensitive adhesive compared to the pressure-sensitive adhesive that does not contain any tackifying resin but is otherwise identical.

Suitable tackifiers are in principle all known substance classes. Tackifiers are, for example, unhydrogenated or partially, selectively or fully hydrogenated hydrocarbon resins (for example polymers based on unsaturated $C_5$, $C_5/C_9$ or $C_9$ monomers), terpene-phenolic resins, polyterpene resins based on raw materials, for example α- or β-pinene and/or δ-limonene, aromatic resins such as coumarone-indene resins or resins based on styrene or α-methylstyrene such as rosin and its conversion products, for example disproportionated, dimerized or esterified rosin, for example reaction products with glycol, glycerol or pentaerythritol, to name just a few. Preference is given to resins having no readily oxidizable double bonds, such as terpene-phenolic resins, aromatic resins and more preferably resins prepared by hydrogenation, for example hydrogenated aromatic resins, hydrogenated polycyclopentadiene resins, hydrogenated rosin derivatives or hydrogenated polyterpene resins.

Preference is given to resins based on terpene-phenols and rosin esters. Preference is likewise given to tackifying resins having a softening point above 80° C. according to ASTM E28-99 (2009). Particular preference is given to resins based on terpene-phenols and rosin esters having a softening point above 90° C. according to ASTM E28-99 (2009).

To further improve the properties, the adhesive formulation may optionally have been blended with light stabilizers or primary and/or secondary ageing stabilizers.

Ageing stabilizers used may be products based on sterically hindered phenols, phosphites, thio synergists, sterically hindered amines or UV absorbers.

Preference is given to using primary antioxidants, for example Irganox 1010 or Irganox 254, alone or in combination with secondary antioxidants, for example Irgafos TNPP or Irgafos 168.

The ageing stabilizers may be used in any combination with one another, and mixtures of primary and secondary antioxidants in combination with light stabilizers, for example Tinuvin 213, show particularly good anti-ageing action.

Very particularly advantageous ageing stabilizers have been found to be those in which a primary antioxidant is combined with a secondary antioxidant in one molecule. These ageing stabilizers are cresol derivatives wherein the aromatic ring is substituted by thioalkyl chains at any two different positions, preferably in ortho and meta position to the OH group, where the sulfur atom may also be bonded via one or more alkyl chains to the aromatic ring of the cresol unit. The number of carbon atoms between the aromatic system and the sulfur atom may be between 1 and 10, preferably between 1 and 4. The number of carbon atoms in the alkyl side chain may be between 1 and 25, preferably between 6 and 16. Particular preference is given here to compounds of the 4,6-bis(dodecylthiomethyl)-o-cresol, 4,6-bis(undecylthiomethyl)-o-cresol, 4,6-bis(decylthiomethyl)-o-cresol, 4,6-bis(nonylthiomethyl)-o-cresol or 4,6-bis(octylthiomethyl)-o-cresol type. Ageing stabilizers of this kind are supplied, for example, by Ciba Geigy under the Irganox 1726 or Irganox 1520 name.

The amount of the ageing stabilizer or ageing stabilizer package added should be within a range between 0.1 and 10 parts by weight, preferably within a range between 0.2 and 5 parts by weight, more preferably within a range between 0.5 and 3 parts by weight, based on the polymer content (acrylates plus any elastomers such as synthetic rubbers).

To improve the processing properties, the formulation may also have been blended with customary processing auxiliaries such as rheology additives (thickeners), defoamers, deaerating agents, wetting agents or leveling agents. Suitable concentrations are within the range from 0.1 up to 5 parts by weight based on the polymer content (acrylates plus any elastomers such as synthetic rubbers).

Fillers (reinforcing or non-reinforcing) such as silicon dioxides (spherical, acicular, in platelet form or in irregular form, such as the fumed silicas), calcium carbonates, zinc oxides, titanium dioxides, aluminium oxides or aluminium oxide hydroxides may serve to adjust either processibility or the adhesive properties. Suitable concentrations are within the range from 0.1 up to 20 parts by weight based on the polymer content (acrylates plus any elastomers such as synthetic rubbers).

The pressure-sensitively adhesive acrylate composition of the pressure-sensitive adhesive layers, in a preferred embodiment of the invention, comprises a polymer mixture of acrylates and synthetic rubbers, where one or more crosslinkers and tackifiers have been mixed into the polymer mixture.

In a further preferred embodiment, the pressure-sensitive adhesive layers comprise black pigment such as carbon black. The proportion is more preferably between 0.1 part by weight and 10 parts by weight, based on the overall composition of the respective layer.

Foaming and Configuration of the Pressure-Sensitive Adhesive Layers

In a preferred embodiment, the pressure-sensitive adhesive layers have been foamed. Preferably, the foam is obtained by the introduction and subsequent expansion of microballoons.

"Microballoons" are understood to mean hollow microbeads that are elastic and hence expandable in their ground state, having a thermoplastic polymer shell. These beads have been filled with low-boiling liquids or liquefied gas. Shell material employed is especially polyacrylonitrile, PVDC, PVC or polyacrylates. Suitable low-boiling liquids are especially hydrocarbons from the lower alkanes, for example isobutane or isopentane, that are enclosed in the polymer shell under pressure as liquefied gas.

Action on the microballoons, especially by the action of heat, results in softening of the outer polymer shell. At the same time, the liquid blowing gas present within the shell is converted to its gaseous state. This causes irreversible extension and three-dimensional expansion of the microballoons. The expansion has ended when the internal and external pressure are balanced. Since the polymeric shell is conserved, what is achieved is thus a closed-cell foam.

A multitude of microballoon types are commercially available, which differ essentially in terms of their size (diameter 6 to 45 μm in the unexpanded state) and the starting temperatures that they require for expansion (75 to 220° C.). One example of commercially available microballoons is the Expancel® DU products (DU=dry unexpanded) from Akzo Nobel.

Unexpanded microballoon products are also available in the form of an aqueous dispersion having a solids/microballoon content of about 40% to 45% by weight, and additionally also in the form of polymer-bound microballoons (masterbatches), for example in ethylene-vinyl acetate with a microballoon concentration of about 65% by weight. Both the microballoon dispersions and the masterbatches, like the DU products, are suitable for production of a foamed pressure-sensitive adhesive according to the invention.

Foamed pressure-sensitive adhesive layers can also be produced with what are called pre-expanded microballoons. In the case of pre-expanded microballoons, expansion already takes place prior to mixing into the polymer matrix. Pre-expanded microballoons are commercially available, for example, under the Dualite® name or with the product designation Expancel xxx DE yy (dry expanded) from Akzo Nobel. "xxx" represents the composition of the microballoon blend. "yy" represents the size of the microballoons in the expanded state.

In the processing of already expanded microballoon types, it is possible that the microballoons, because of their low density in the polymer matrix into which they are to be incorporated, will have a tendency to float, i.e. to rise "upward" in the polymer matrix during the processing operation. This leads to inhomogeneous distribution of the microballoons in the layer. In the upper region of the layer (z direction), more microballoons are to be found than in the lower region of the layer, such that a density gradient across the layer thickness is established.

In order to largely or very substantially prevent such a density gradient, preference is given in accordance with the invention to incorporating only a low level of, if any, pre-expanded microballoons into the polymer matrix of the pressure-sensitive adhesive layers. Only after the incorporation into the layer are the microballoons expanded. In this way, a more homogeneous distribution of the microballoons in the polymer matrix is obtained.

Preferably, the microballoons are chosen such that the ratio of the density of the polymer matrix to the density of the (non-pre-expanded or only slightly pre-expanded) microballoons to be incorporated into the polymer matrix is between 1 and 1:6, i.e.:

$$\frac{\text{Density of the polymer matrix}}{\text{Density of the microballoons to be incorporated}} = 1\ 1.6$$

Expansion then follows immediately after or occurs directly in the course of incorporation. In the case of solvent-containing compositions, the microballoons are preferably expanded only after incorporation, coating, drying (solvent evaporation). Preference is therefore given in accordance with the invention to using DU products.

According to the invention, the average diameter of the voids formed by microballoons in the foamed pressure-sensitive adhesive layers is preferably 10 to 200 μm, more preferably from 15 to 200 μm. Since it is the diameters of the voids formed by the microballoons in the foamed pressure-sensitive adhesive layers that are being measured here, the diameters are those diameters of the voids formed by the expanded microballoons. The average diameter here is the arithmetic average of the diameters of the voids formed by the microballoons in the pressure-sensitive adhesive layer. The average diameter of the voids formed by the microballoons in a pressure-sensitive adhesive layer is determined using 5 different cryofracture edges of the adhesive tape in a scanning electron microscope (SEM) with 500-fold magnification. The diameters of the microballoons visible in the micrographs are determined by graphical means in such a way that the maximum extent thereof in any (two-dimensional) direction is inferred from the scanning electron micrographs for each individual microballoon in the pressure-sensitive adhesive layer to be examined and regarded as the diameter thereof.

If the pressure-sensitive adhesive used in accordance with the invention is an acrylate composition blended with an elastomer component, the size of the elastomer domains in their greatest extent is typically between 0.5 μm and 150 μm, especially between 1 μm and 30 μm; see above. In a particularly preferred manner, in that case, the average diameter of the voids formed by the microballoons and the average diameter of the domains of the elastomer component within the same size range are below 100 μm, especially in each case in the range between 10 μm and 30 μm. The average diameter of the domains of the elastomer component is determined analogously to the average diameter of the voids formed by the expanded microballoons.

If foaming is effected by means of microballoons, the microballoons can then be supplied to the formulation as a batch, paste or unblended or blended powder. In addition, they may be suspended in solvents.

The proportion of the microballoons in the pressure-sensitive adhesive layers, in a preferred embodiment of the invention, is between greater than 0% by weight and 12% by weight, especially between 0.25% by weight and 5% by weight, even more preferably between 0.5% and 3% by weight, based in each case on the overall composition (including incorporated microballoons) of the corresponding layer. The figures are each based on unexpanded microballoons.

A polymer composition for the pressure-sensitive adhesive layers that comprises expandable hollow microbeads may additionally also contain non-expandable hollow microbeads. What is crucial is merely that virtually all gas-containing caverns are closed by a permanently impervious membrane, no matter whether this membrane consists of an elastic and thermoplastically extensible polymer mixture or, for instance, of elastic and—within the spectrum of the temperatures possible in plastics processing—non-thermoplastic glass.

Also suitable for the pressure-sensitive adhesive layers—selected independently of other additives—are solid polymer beads such as PMMA beads, hollow glass beads, solid glass beads, phenolic resin beads, hollow ceramic beads, solid ceramic beads and/or solid carbon beads ("carbon microballoons").

The absolute density of the foamed pressure-sensitive adhesive layers is preferably 350 to 950 kg/$m^3$, more preferably 450 to 930 kg/$m^3$, especially 570 to 880 kg/$m^3$. The relative density describes the ratio of the density of the respectively foamed layer to the density of the corresponding unfoamed layer having an identical formulation. The relative density of the pressure-sensitive adhesive layers is preferably 0.35 to 0.99, more preferably 0.45 to 0.97, especially 0.50 to 0.90.

In one embodiment of the invention, one or both surfaces of the pressure-sensitive adhesive layers have been physically and/or chemically pretreated. Such a pretreatment can be effected, for example, by plasma pretreatment and/or primer treatment. If both surfaces of the pressure-sensitive adhesive layers have been pretreated, the pretreatment of each surface may have been different or, more particularly, both surfaces may have been given the same pretreatment.

The plasma treatment—especially low-pressure plasma treatment—is a known process for surface pretreatment of adhesives. The plasma leads to activation of the surface in the sense of a higher reactivity. This results in chemical changes to the surface, as a result of which, for example, the characteristics of the adhesive with respect to polar and nonpolar surfaces can be influenced. This pretreatment essentially comprises surface phenomena.

Primers refer generally to coatings or basecoats which especially have an adhesion-promoting and/or passivating and/or corrosion-inhibiting effect. In the context of the present invention, it is the adhesion-promoting effect that is especially important. Adhesion-promoting primers, often also called adhesion promoters, are in many cases known in the form of commercial products or from the technical literature.

The pressure-sensitive adhesive layers according to the invention typically have a thickness of 20 to 300 μm, preferably of 50 to 200 μm and especially of 100 to 150 μm. The adhesive tapes according to the invention typically have a thickness of 40 to 850 μm, preferably of 150 to 600 μm and especially of 250 to 400 μm.

The production and processing of the pressure-sensitive adhesives can be effected either from solution or from the melt. The application of the pressure-sensitive adhesives can be effected by direct coating or by lamination, especially hot lamination.

Crosslinking of the Pressure-Sensitive Adhesive Layers:

The pressure-sensitive adhesive layers are preferably in crosslinked form in the adhesive tape according to the invention, especially if the pressure-sensitive adhesive is one based on polyacrylate or based on a blend of polyacrylate with synthetic rubber such as vinylaromatic block copolymer. The crosslinking preferably takes place in the pressure-sensitive adhesive in the form of a layer or of a film.

The crosslinking reaction may especially proceed as follows:

In an advantageous procedure, the two substances are applied to the polymer in solution as a pure substance or predissolved in a suitable solvent, then the polymer is mixed thoroughly with the crosslinkers, coated onto a temporary or permanent carrier and then dried under suitable conditions, under which the crosslinking takes place.

In an optional procedure especially suitable for very reactive systems, first of all, one of the crosslinkers is added to the polymer solution in pure or predissolved form. The second crosslinker is not fed in until shortly before the coating, for example via inline metered addition with a downstream active or static mixer and subsequent coating and drying.

The pot life (processing time) of the coordinative crosslinkers can be increased by adding the above-described ligands to the polymer/crosslinker solution. The ligand excess is then removed in the course of drying; only then are the coordinative crosslinkers (fully) reactive.

The drying conditions (temperature and residence time) are very preferably chosen such that not only is the solvent removed but the crosslinking is also complete to a large degree, such that a stable level of crosslinking—especially at relatively high temperatures—is achieved. More particularly, the adhesive is fully crosslinked.

Full crosslinking of an adhesive is understood in accordance with the invention to mean that the maximum shear travel "max" thereof in the micro-shear travel test, under the conditions specified therein, in the case of repeated (for example daily) micro-shear travel measurement within a period of 48 hours, changes only within the accuracy of the test method (for instance up to a maximum of 5%) when the adhesive is stored at room temperature (23° C.) under otherwise standard conditions.

According to the field of use of the adhesive, the detection of complete crosslinking can also be conducted for other temperatures (for example 40° C., especially those temperatures that correspond to the respective use temperatures).

Use of the Adhesive Tape:

In an advantageous manner, the pressure-sensitive adhesive tape according to the invention can be used for bonding of components for precision mechanical, optical, electrical and/or electronic devices, for example in the manufacture, repair or decoration thereof or the like. Examples of materials used for bonding here may include plastics, glasses, metals and the like.

The pressure-sensitive adhesive tape according to the invention is especially also suitable for permanent bonding of flexible materials, especially in the manufacture of flexible displays. Displays of this kind are increasing in importance.

In an advantageous manner, the pressure-sensitive adhesive tape according to the invention can be used for bonding of windows or lenses in housings of precision-mechanical, optical and/or electronic devices (called "lens mounting"). In this case, at least one of the rigid or flexible substrates is transparent or translucent. The transparent or translucent substrate may, for example, be a window or an optical lens for the purpose of protection of sensitive components arranged beneath—such components may, for example, be liquid-crystal displays (LCDs), light-emitting diodes (LEDs) or organic light-emitting diodes (OLEDs) of displays, but also printed circuits or other sensitive electronic components; this plays a major role, for example, in use for touch-sensitive displays—and/or to bring about optical effects for the function of the device—for example refraction of light, concentration of light, attenuation of light, amplification of light etc.

Very advantageously, the transparent substrate is chosen such that it has a haze value of not more than 50%, preferably of not more than 10%, very preferably of not more than 5% (measured according to ASTM D 1003).

The second substrate is preferably likewise a component of a precision-mechanical, optical and/or electronic device. Conceivable in particular here are housings of such devices or holders for windows or lenses as described above.

In a preferred procedure, the transparent or translucent substrate is a substrate made of glass, polymethylmethacrylate and/or polycarbonate.

More particularly, the second substrate may consist of plastics such as acrylonitrile-butadiene-styrene copolymers (ABS), polyamide or polycarbonate, which may especially also be glass fibre-reinforced; or of metals such as aluminium—including anodized (eloxed) aluminium—or magnesium and metal alloys.

Additives, for example dyes, light stabilizers, ageing stabilizers, plasticizers or the like, may also have been added to the substrate materials if this is advantageous for the intended end use, and in the case of transparent or translucent materials more particularly to such an extent that it impairs these optical properties only to an acceptable degree, if at all.

According to the invention, the composite according to the invention is thus a component of an electronic, optical or precision-mechanical device as cited in the table above.

Process for Producing TPU Carriers by Means of Extrusion:

FIG. 1 shows, by way of example, the process for producing TPU carriers by means of extrusion of TPU and elongate sheet form. The reference numerals therein have the following meanings:

- A: starting materials: all materials required for production of mixture G
- G: homogeneous mixture
- 1: continuous mixing unit or conveying unit having mixing zones, for example single-screw or twin-screw extruders, planetary roll extruders or the like
- 11: heating zones of the continuous mixing unit
- 12: outlet from the continuous mixing unit or conveying unit with mixing section
- 13: various metering orifices, different designs
- 2: optional heated tube, heating zone, not needed in all process versions
- 3: die for preliminary forming of the extrudate, e.g. slot die, coextrusion die, multilayer die
- 4: coating unit, application system, deposition roll with or without opposing roll, calender, or the like, cooled or heatable The following are not shown:

- systems for surface treatment of the carrier materials or finished layers, for example corona, UV or the like
- unwinding stations—for provision of films with or without release properties, carriers, textile carriers or the like
- winding stations—for winding of the end product, auxiliary carriers or the like
- metering aggregates and systems a) Extrusion and Coating of Compact TPU:

All constituents of the formulation based on TPU to be produced are first dried in a pellet dryer (T=90° C., 3 h) and then supplied to a continuous mixing or conveying aggregate with mixing section 1 via metering orifices 13 and metering or conveying systems. The temperature is controlled in accordance with the optimal conditions required for the production of a homogeneous mixture G.

The outlet 12 from the continuous conveying aggregate with mixing section or mixing aggregate, or the further components for conveying of the extrudate to the preliminary forming via a nozzle or distributor channel or directly to the coating unit 4, may have different configurations. In order to coat a flat film, a slot die is suitable for preliminary forming of the extrudate or of a melt film. The latter is deposited directly onto a rotating, generally chilled roll (called a chill roll), in which case the layer thickness can be regulated additionally via the takeoff speed. Alternatively, it is coated directly onto a preliminary material, for example (temporary) carrier or functional layer, such as a pressure-sensitive adhesive layer in particular.

In a particularly advantageous process according to the invention, the previously homogenized mixture, extrudate, is formed by means of a slot die to give a melt film and coated directly onto a first adhesive layer disposed on a temporary support, such as a (siliconized) liner in particular. This prefabricated functional layer is supplied beforehand via the chill roll via an unwinding station.

This composite composed of temporary carrier (liner), adhesive layer and PU layer, before being wound to give a bale, is laminated with a second prefabricated adhesive layer on a temporary carrier (such as a release liner in particular). The end product now consists of three layers (adhesive-PU-carrier-adhesive), sandwiched between two temporary carriers (such as liners in particular). A temporary carrier (such as a liner in particular) may be removed before winding to a bale.

This procedure has many advantages: a multilayer product can be produced particularly efficiently, composite strength/anchoring between adhesive (or any kind of functional/carrier layer) and TPU layer is improved; the often problematic intermediate step of transfer coating (TPU to release carrier) is avoided in a simple manner. For instance, even particularly soft TPU types are amenable to production, and there is no need for processing auxiliaries, such as waxes and lubricants, co-extruded support carriers or additional auxiliary liners as typically required in the production of TPU carriers.

b) Extrusion and Coating of Foamed TPU:

All constituents of the formulation to be produced based on TPU (after drying), including the unexpanded microballoons, are supplied to a continuous mixing or conveying aggregate with mixing section 1 via metering orifices 13 and metering or conveying systems. The temperature is controlled in accordance with the optimal conditions required for the production of a homogeneous mixture G and the foaming of the microballoons. Up to the outlet 12, there is a continuous opposing pressure in order to avoid premature expansion of the microballoons.

The outlet 12 from the continuous conveyor aggregate with mixing section or mixing aggregate, or the further components for conveying of the extrudate to the preliminary forming via a nozzle or distributor channel or directly to the coating unit 4, may have different configurations. In order to coat a flat film, a slot die is suitable for preliminary forming of the extrudate or of a melt film. In order to prevent the expanding microballoons from penetrating the coated surface and hence producing a rough surface, which in turn causes poor anchoring to the functional layer, an opposing pressure during the coating operation is required. This may be, for example, an impression roll or opposing roll against the coating roll, or the coating is performed directly in a calender. Here too, it may be coated directly onto a preliminary material, for example a (temporary) carrier or a functional layer, such as a pressure-sensitive adhesive layer in particular.

This composite composed of temporary carrier (liner), adhesive layer and PU layer, before being wound to give a bale, is laminated with a second prefabricated adhesive layer on a temporary carrier (such as a release liner in particular), or any other kind of functional layer to the opposite side.

The end product now consists of three layers (adhesive-foamed PU-carrier-adhesive), sandwiched between two temporary carriers (such as liners). A temporary carrier (liner) may be removed before winding to a bale. Direct coating onto additional functional layers has many advantages: a multilayer product can be produced particularly efficiently; composite strength/anchoring between adhesive or any kind of functional/carrier layer and TPU layer is improved; the often problematic intermediate step of transfer coating (TPU to release carrier) is avoided in a simple manner. For instance, even particularly soft TPU types are amenable to production, and there is no need for processing auxiliaries, such as waxes and/or lubricants, co-extruded support carriers or additional auxiliary liners as typically required in the production of TPU carriers.

Closed-cell TPU foams containing microballoons are not commercially available, and so this process according to the invention and the resulting carrier layers form the basis for innovative products.

Further options for production of open-cell TPU foams are available: the addition of chemical blowing agents or the controlled injection of gas, i.e. a physical blowing agent.

The chemical blowing agent is added directly with the starting materials to the continuous conveying aggregate with a mixing section, or via one of the additional metering orifices. The processing and coating are effected as described above.

Gas is injected via an additional metering orifice into the extruder, into the melt mixture. The gas is supplied in a controlled manner, such that the gas content in the mixture and the resulting density can be adjusted. Processing and coating are effected as described above.

Process for Producing PU Carriers from Dispersion:

a) Production and Coating of PU Dispersions:

The production of a homogeneous, bubble-free dispersion mixture requires stirring equipment suitable for dispersions. Thickeners and other additives are usually predispersed with water and then supplied to the PU dispersion in portions while constantly stirring cautiously.

In the course of the stirring process, vortexes or excessively rapid speeds should be avoided in order to prevent unwanted stirring-in of air. It is advisable to make up the blend a few hours prior to the coating in order to promote escape of small air bubbles that have been stirred in.

The coating can be effected by means of different application systems, for example squeegee, nozzle or distributor channels etc. The coated PU dispersion is dried via supply of heat in a drying tunnel with different heating zones. The coating of the PU dispersion can be effected either onto a (temporary) carrier or directly onto a functional layer, such as a pressure-sensitive adhesive layer in particular. After the drying and before the winding, a second functional layer may be laminated onto the opposite side, such that it is possible to produce a multilayer product in one step. The multilayer composite thus produced is wound up to give a bale. A liner or other auxiliary carrier may be removed beforehand.

This procedure has many advantages: a multilayer product can be produced particularly efficiently, composite strength/anchoring between adhesive or any kind of functional/carrier layer and PU layer is improved; the often problematic intermediate step of transfer coating (PU to release carrier) is avoided in a simple manner.

The PU-based carrier layer made from dispersion or the adhesive tape comprising this layer is additionally typically subjected to a heat treatment at at least 150° C. in order to optimize tensile strength.

b) Production and Coating of Foamable PU Dispersions:

The production of a homogeneous, bubble-free dispersion mixture foamable with microballoons requires stirring equipment suitable for dispersions. Thickeners and/or other additives, including the unexpanded microballoons, are usually predispersed with water and then supplied to the PU dispersion in portions while constantly stirring cautiously. In the course of the stirring process, vortexes or excessively rapid speeds should be avoided in order to prevent unwanted stirring-in of air. It is advisable to make up the blend a few hours prior to the coating in order to promote escape of small air bubbles that have been stirred in.

The coating can be effected by means of different application systems, for example squeegee, nozzle or distributor channels etc. The coated PU dispersion is dried via supply of heat below the foaming temperature in a drying tunnel with different heating zones. The coating of the PU dispersion can be effected either onto a (temporary) carrier or directly onto a functional layer, such as a pressure-sensitive adhesive layer in particular. After the drying and before the winding, a second functional layer may be laminated onto the opposite side, such that it is possible to produce a multilayer product in one step.

The multilayer composite thus produced is wound up to give a bale. A liner or other auxiliary carrier may be removed beforehand. This procedure has many advantages: a multilayer product can be produced particularly efficiently, composite strength/anchoring between adhesive or any kind of functional/carrier layer and PU layer is improved; the often problematic intermediate step of transfer coating (PU to release carrier) is avoided in a simple manner.

In a further operating step, the overall composite or a single layer of the foamable PU carrier is sandwiched with temporary carrier, such as auxiliary liner in particular, and partly or fully foamed by further supply of heat through a heating tunnel or heatable contact rolls, or the microballoons are expanded. The sandwiching of the foamable PU carrier with carrier, auxiliary liner or functional layer prevents penetration of the surface by the expanding microballoons, such that a good bond strength is achieved between the individual layers. The foaming with microballoons produces a closed-cell PU foam. Typically, the PU-based carrier layer made from dispersion or the adhesive tape comprising this layer is subjected to a heat treatment at at least 150° C. in order to optimize tensile strength.

By stirring in a controlled amount of air, called "frothing", it is additionally possible to produce an open-cell PU foam. Here, by means of stirring equipment suitable for the purpose and special stirring conditions, the beating-in of air is induced in a controlled manner. The continuation of the production process is effected analogously to the process described above.

Figure 2:
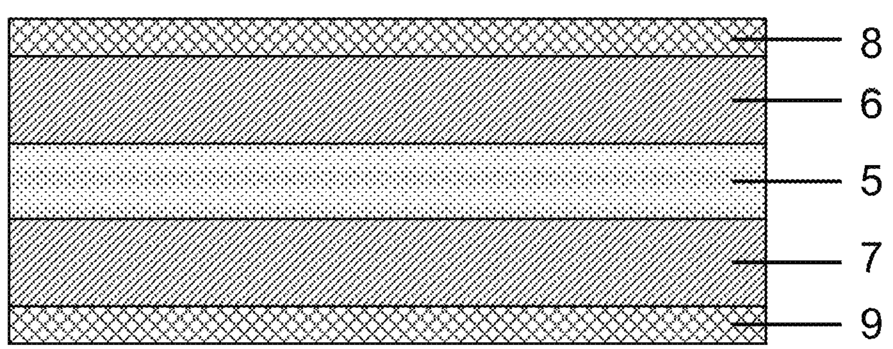
FIG. 2 shows the schematic construction of a three-layer pressure-sensitive adhesive tape according to the invention.

Schematic Structure of a Three-Layer Pressure-Sensitive Adhesive Tape According to the Invention:

FIG. 2 shows the schematic construction of a three-layer pressure-sensitive adhesive tape according to the invention, composed of three layers 5, 6, 7 in cross section. The adhesive tape comprises a single-layer carrier 5 based on polyurethane. There are two pressure-sensitive adhesive layers 6, 7 based on polyacrylate on the top side and on the bottom side of the carrier. The pressure-sensitive adhesive layers 6, 7 are covered in turn by a liner 8, 9 on each side in the illustrative embodiment shown.

In one production process according to the invention for a pressure-sensitive adhesive tape (illustratively) foamed with microballoons, all constituents of the pressure-sensitive adhesive based on polyacrylate are dissolved in a solvent mixture (benzine/toluene/acetone). The microballoons have been converted to a slurry in benzine and stirred into the dissolved adhesive.

For this purpose, it is possible in principle to use the known compounding and stirring units, and it should be ensured that the microballoons do not yet expand in the course of mixing. As soon as the microballoons are distributed homogeneously in the solution, the adhesive can be coated, for which it is again possible to use prior art coating systems. For example, the coating can be accomplished by means of a squeegee onto a conventional PET liner. In the next step, the adhesive layer thus produced is dried at 100° C. for 15 min. In none of the aforementioned steps is there any expansion of the microballoons.

The polyurethane-based carrier layer is laminated onto the free surface of the adhesive layer thus produced and dried. Laminated on the second surface thereof is the free surface of a second, likewise dried adhesive layer produced in this way, so as to result in an unfoamed three-layer composite composed of the inner carrier layer and two adhesive layers provided with liners.

Alternatively, the carrier layer based on polyurethane can be directly coated simultaneously or subsequently with the unfoamed adhesives that have been provided with microballoons, and then these still-exposed adhesive layers are dried at 100° C. for 15 min and then covered with liners, so as to result in the unfoamed three-layer composite.

After the drying, the adhesive layers are foamed in the oven within an appropriate temperature/time window, for instance at 150° C. for 5 min or at 170° C. for 1 min, specifically covered between the two liners, in order to produce a particularly smooth surface.

The surface thus produced typically has a roughness Ra of less than 15 μm, more preferably less than 10 μm, most preferably less than 3 μm. The surface roughness is preferably Ra is a unit for the industrial standard for the quality of the final surface processing and constitutes the average height of the roughness, especially the average absolute distance from the centre line of the roughness profile within the range of evaluation. This is measured by means of laser triangulation.

The expansion temperature chosen is especially higher than drying temperature in order to avoid the expansion of the microballoons in the course of drying.

The invention is elucidated in detail hereinafter by a few illustrative adhesive tapes. With reference to the examples described hereinafter, particularly advantageous executions of the invention will be elucidated in detail, without any intention to unnecessarily restrict the invention thereby.

EXAMPLES

Table 1 shows the (raw) materials used in the (comparative) examples.

TABLE 1

(raw) materials used in the (comparative) examples.

| Raw material | Manufacturer/ supplier | Description |
|---|---|---|
| Ortegol PV 301 | Evonik | Polyurethane solution (thickener) |
| Borchi Gel 0625 | Borchers GmbH | Nonionic, polyurethane-based thickener for water-based coating systems |
| Expancel 920 DU 20 | Nouryon | Unexpanded, expandable, dry micro-balloons having an average diameter after expansion of 20 μm |
| Kemafoil HPH 100 | Coveme S.P.A | Double-sidedly etched PET film of thickness 50 μm, colourless |
| Elastollan C85A10 (for production of the carrier called "TPU1" here) | BASF Polyurethanes GmbH | Thermoplastic polyurethane (pellets), Shore A hardness = 87 |
| Elastollan S60A15 (for production of the carrier called "TPU2" here) | BASF Polyurethanes GmbH | Thermoplastic polyurethane (pellets), Shore A hardness = 60 |
| Impranil DL 1116 (for production of the carriers called "PUD1", "PUD2", "PUD3", "PUD4" and "PUD5" here) | Covestro | Anionically stabilized polyester-polyurethane dispersion, 100% modulus (film of dispersion thickened with 1% by weight of Borchigel ALA) = 1.4 MPa to DIN 53504 |
| Impranil DL 1068 (for production of the carrier called "PUD6" here) | Covestro | Anionically stabilized polyether-polyurethane dispersion, 100% modulus (film of dispersion thickened with 1% by weight of Borchigel ALA) = 1.5 MPa to DIN 53504 |
| Kraton D 1118 | Kraton Performance Polymers, Inc. | Elastomer: Styrene-butadiene-styrene triblock copolymer with 78% by weight of diblock, block polystyrene content: 33% by wt. |
| Dertophene T | DRT resins | terpene-phenolic resin (softening point 110° C. ; $M_w$ = 500 to 800 g/mol; D = 1.50) |
| Erysis GA 240 | Emerald Performance Materials, | N,N,N',N'-tetrakis(2,3-epoxypropyl)-m-xylene-a, a'-diamine |

Production of the Pressure-Sensitive Adhesive Layer Used in the Adhesive Tapes:

The pressure-sensitive adhesive layer used in each of the (comparative examples) contains an acrylate-based starting polymer, called base polymer P1 hereinafter, and a vinylaromatic block copolymer (Kraton D 1118). The base polymer P1 is prepared as follows:

A conventional reactor for free-radical polymerizations was charged with 47.5 kg of 2-ethylhexyl acrylate, 47.5 kg of n-butyl acrylate, 5 kg of acrylic acid and 66 kg of benzine/acetone (70/30). After passing nitrogen gas through for 45 minutes with stirring, the reactor was heated up to 58° C. and 50 g of AIBN was added. Subsequently, the external heating bath was heated to 75° C. and the reaction was conducted constantly at this external temperature. After 1 h, another 50 g of AIBN was added and, after 4 h, the mixture was diluted with 20 kg of benzine/acetone mixture. After 5.5 and after 7 h, 150 g each time of further bis(4-tert-butylcyclohexyl) peroxydicarbonate initiator was added. After a reaction time of 22 h, the polymerization was stopped and the mixture was cooled to room temperature. The polyacrylate has an average molecular weight of $M_w$=386 000 g/mol, polydispersity PD ($M_w/M_n$)=7.6.

The pressure-sensitive adhesive layer used in each of the (comparative) examples is produced as follows:

A mixture comprising 42.425% by weight, based on the dry weight of the polymer, of the base polymer P1, 37.5% by weight of the Dertophene T tackifying resin and 20% by weight of Kraton D 1118 is prepared. The addition of benzine establishes a solids content of 38% by weight. The mixture of polymer and tackifying resin is stirred until the tackifying resin has visibly fully dissolved. Thereafter, 0.075% by weight of the covalent crosslinker Erysis GA 240 is added. The mixture is stirred at room temperature for 15 minutes. The proportions by weight of the dissolved constituents are each based on the dry weight of the resulting solution. During this time, 0.8% by weight of unexpanded microballoons (Expancel 920 DU20) is added, with use of the microballoons in the form of a slurry in benzine. The proportions by weight of the microballoons are based on the dry weight of the solution used to which they are added (i.e. the dry weight of the solution used is fixed at 100%). The resultant mixture is then coated with a coating bar onto a PET liner provided with a silicone separator in the layer thickness desired in each case. Subsequently, the solvent is evaporated off at 100° C. for 15 min, and hence the adhesive layer is dried. The microballoons are still in unexpanded form therein, i.e. the pressure sensitive-adhesive layer is yet to be foamed.

Production of the Adhesive Tapes of the (Comparative) Examples:

Table 2 shows the formulations of the polyurethane-based carriers produced in inventive examples 1 to 8.

TABLE 2

Formulations of the carriers produced in the (comparative) examples.

| Carrier designation | Component | Raw material | Proportion |
|---|---|---|---|
| Core layer TPU 1 | TPU pellets | Elastollan C85A 10 | 100.0% by wt. |
| Core layer TPU 2 | TPU pellets | Elastollan S60A15 | 100.0% by wt. |

TABLE 2-continued

Formulations of the carriers produced in the (comparative) examples.

| Carrier designation | Component | Raw material | Proportion |
|---|---|---|---|
| Core layer PUD 1 | PU dispersion | Impranil DL 1116 | 99.4% by wt. |
| | Thickener | Ortegol PV 301 | 0.6% by wt. |
| Core layer PUD2 | PU dispersion | Impranil DL 1116 | 99.5% by wt. |
| | Thickener | Borchi Gel 0625 | 0.5% by wt. |
| Core layer PUD 3 | PU dispersion | Impranil DL 1116 | 99.0% by wt. |
| | Thickener | Borchi Gel 0625 | 0.5% by wt. |
| | Microballoons | Expancel 920DU20 | 0.5% by wt. |
| Core layer PUD 4 | PU dispersion | Impranil DL 1116 | 98.5% by wt. |
| | Thickener | Borchi Gel 0625 | 0.5% by wt. |
| | Microballoons | Expancel 920DU20 | 1% by wt. |
| Core layer PUD5 | PU dispersion | Impranil DL 1116 | 98.0% by wt. |
| | Thickener | Borchi Gel 0625 | 0.5% by wt. |
| | Microballoons | Expancel 920DU20 | 1.5% by wt. |
| Core layer PUD6 | PU dispersion | Impranil DL 1086 | 98.0% by wt. |
| | Thickener | Borchi Gel 0625 | 0.5% by wt. |
| | Microballoons | Expancel 920DU20 | 1.5% by wt. |

In Comparative Example 9, the purchased Kemafoil HPH 100 film from Coveme S.P.A. was used, which is a colourless, double-sidedly etched PET carrier film of thickness 50 μm.

The production of the individual adhesive tapes was performed as follows:

Production of the Adhesive Tapes with TPU Core Layers TPU 1 (Example 1) and TPU 2 (Example 2)

The pellets of thermoplastic polyurethane, i.e. TPU pellets 1 and 2 for production of the carriers called TPU 1 and TPU 2 (i.e. cores or core layers), prior to processing, are predried at 80° C. in a pellet dryer (Somos) for at least 3 hours. The pellets are supplied to the single-screw extruder (Collin, 25D), called SSE hereinafter, via the intake zone via a simple reservoir vessel/funnel. The SSE temperature is controlled in accordance with the optimal processing temperature for the respective TPU pellets. After the pellets have been melted, the extrudate is transferred via a hose into a feed block and then into the slot die. Table 3 shows the control of the SSE temperature, including the slot die.

TABLE 3

Control of SSE temperature, including the slot die.

| | Extruder and slot die | | | | | | | | | | |
|---|---|---|---|---|---|---|---|---|---|---|---|
| | Intake | Heating zones of single-screw extruder | | | | | | Speed | Hose | Feed block | Die |
| | Zone 1 [° C.] | 2 [° C.] | 3 [° C.] | 4 [° C.] | 5 [° C.] | 6 [° C.] | 7 [° C.] | n [° C.] | 8 [° C.] | 9 [° C.] | 10 [° C.] |
| TPU 1 | 30 | 165 | 175 | 180 | 180 | 190 | 190 | 15 | 200 | 210 | 210 |
| TPU 2 | 30 | 165 | 175 | 180 | 180 | 190 | 190 | 15 | 190 | 200 | 200 |

*rpm = revolutions per minute.

The preformed melt film is then deposited onto a steel roll. Since the TPA variants having lower Shore hardness have somewhat greater pressure-sensitive adhesion and are thus more difficult to remove again from the steel roll, it has been found to be useful to coat directly onto a PET carrier having release function, i.e. temporary carrier or liner, which is supplied via an unwinder and by wrapping halfway around the takeoff roll, and then wound up. The produced TPU carriers (TPU core layers) 1 (Example 1) and 2 (Example 2) are free of processing auxiliaries and do not have a crystalline superstructure.

After the desired layer thickness has been established, the unwinder for the bale with the PET carrier having release function is exchanged for the prefabricated functional layer, i.e. the pressure-sensitive adhesive layer containing unexpanded microballoons as described above. In this way, coating is effected directly onto the functional layer. By means of a further unwinder, the second prefabricated pressure-sensitive adhesive layer (containing unexpanded microballoons as described above), having the same thickness as the first pressure-sensitive adhesive layer, is laminated by means of the guide roll or contact pressure roll onto the open TPU layer at the top. This three-layer product is then wound up. The overall composite composed of carrier and pressure-sensitive adhesive layers, for better anchoring and foaming of the pressure-sensitive adhesive layers, is subjected to a further thermal treatment step. For this purpose, the material wound up, with a temperature profile having three zones at 120° C./135° C./170° C., at a belt speed of 6 m/min, is run through a tunnel system and then wound up again. The result is the foamed double-sided adhesive tapes with TPU core layers TPU 1 (Example 1) and TPU 2 (Example 2).

Production of the Adhesive Tape with PET Carrier Film (Comparative Example 9)

The purchased Kemafoil HPH 100 film from Coveme S.P.A. is laminated on either side with the pressure-sensitive adhesive layer comprising unexpanded microballoons as described above. The two pressure-sensitive adhesive layers have the same thickness. The overall composite composed of carrier and pressure-sensitive adhesive layers, for better anchoring and foaming of the pressure-sensitive adhesive layers, is subjected to a further thermal treatment step. For this purpose, the material wound up, with a temperature profile having three zones at 120° C./135° C./170° C., at a belt speed of 6 m/min, is run through a tunnel system and then wound up again. The result is a foamed double-sided adhesive tape having a PET carrier layer (Comparative Example 9).

Production of the Adhesive Tapes with PUD Core Layers PUD 1 to PUD 6 (Examples 3 to 8)

The corresponding polyurethane dispersion (PU dispersion, PUD) 1 to 6 is blended with the thickener and optionally the microballoons (if used) in each case by means of a conventional vertical stirrer apparatus with a Visco Jet stirrer. The polyurethane dispersion is initially charged in a sufficiently large vessel and stirred cautiously. Formation of vortices or any stirring-in of air should be avoided throughout the blending process. If microballoons are to be added, these are prediluted with water in a ratio of 1:1 and then supplied in portions to the initially charged polyurethane dispersion while stirring continuously. Subsequently, the Ortegol PV301 thickener (solids content 25% by weight) or the BorchiGel 0625 thickener (solids content 33% by weight) is prediluted with water in a ratio of 1:2 and supplied in portions with constant stirring. In order to obtain a homogeneous mixture, a stirring time of at least 30 minutes is observed. The thickened polyurethane dispersion thus made up is ideally produced one day prior to coating. Small air bubbles that have been stirred in can thus escape. Then the blended polyurethane dispersions can be coated by means of a coating system, i.e. application system, with a drying tunnel. Table 4 shows relevant parameters for the coating system and drying tunnel. The produced PUD core layers (i.e. the PUD cores) 1 to 6 (from Examples 3 to 8) are free of processing auxiliaries and do not have a crystalline superstructure. If present, microballoons are in an unexpanded form therein, i.e. the corresponding PUD core layers are yet to be foamed.

TABLE 4 shows relevant parameters for the coating system and drying tunnel.

| | Application system | | | | | Drying tunnel | | |
|---|---|---|---|---|---|---|---|---|
| | Hose [° C.] | Coating roll [° C.] | Squeegee | Gap [μm] | V [m/min] | Heating zone 1 [° C.] | 2 [° C.] | 3 [° C.] |
| PUD 1 | 20 | 20 | comma-type | 60 | 2.5 | 80 | 100 | 110 |
| PUD 2 | 20 | 20 | comma-type | 130 | 1.3 | 80 | 100 | 110 |
| PUD 3 | 20 | 20 | comma-type | 120 | 1.5 | 80 | 100 | 110 |
| PUD 4 | 20 | 20 | comma-type | 100 | 2.0 | 80 | 100 | 110 |
| PUD 5 | 20 | 20 | comma-type | 80 | 2.2 | 80 | 100 | 110 |
| PUD 6 | 20 | 20 | comma-type | 90 | 2.0 | 80 | 100 | 110 |

By means of 2 unwinders, either a PET carrier with release function or a prefabricated functional layer, i.e. pressure-sensitive adhesive layer, on a PET carrier with release function is provided. It has been found to be useful to establish the desired layer thickness on PET carrier and then to switch to the prefabricated functional layer (i.e. the pressure-sensitive adhesive layer containing unexpanded microballoons as described above) and coat it directly. Before winding, a controllable contact pressure roll is then used to laminate the second prefabricated pressure-sensitive adhesive layer (containing unexpanded microballoons as described above), having the same thickness as the first pressure-sensitive adhesive layer, therewith. The three-layer product thus produced is then wound up. The overall composite composed of carrier and pressure-sensitive adhesive layers, for optimization of the tensile strength of the carrier, for better anchoring and for foaming of the layers containing microballoons, is subjected to a further thermal treatment step. For this purpose, the material wound up, with a temperature profile having three zones at 120° C./135° C./170° C., at a belt speed of 6 m/min, is run through the same tunnel system and then wound up again. The result is the foamed double-sided adhesive tapes with PUD core layers PUD 1 (Example 3) to PUD 6 (Example 8).

Results

Table 5 shows the structure of the adhesive tapes of the (comparative) examples that are formed by combination of the aforementioned carriers from Table 2 and pressure-sensitive adhesive layer based on polymer P1 and Kraton D 1118. The adhesive tapes are each double-sided, meaning that a pressure-sensitive adhesive layer (of the same thickness) is disposed on each side of the carrier. The table also shows mechanical and adhesive properties of the adhesive tapes.

TABLE 5

Structure of the adhesive tapes from the (comparative) examples and their mechanical and adhesive properties.

| Example | Carrier variant | Carrier thickness [μm] | Adhesive tape thickness [μm] | DuPont z E [J]* | Drop tower test E [J]* | Redetachability [1-5]* | Stretching distance [mm]* |
|---|---|---|---|---|---|---|---|
| 9 (comp.) | PET | 50 | 330 | 1.10 | 1.49 | 5 | 0.45 |
| 3 | PUD 1 | 50 | 330 | 1.20 | 1.82 | 5 | 0.13 |
| 1 | TPU 1 | 50 | 330 | 1.30 | 1.58 | 5 | 0.06 |
| 4 | PUD 2 | 100 | 330 | 1.02 | 1.62 | 5 | 0.11 |
| 5 | PUD 3 | 100 | 330 | 1.04 | 1.69 | 5 | 0.02 |

TABLE 5-continued

Structure of the adhesive tapes from the (comparative) examples and their mechanical and adhesive properties.

| Example | Carrier variant | Carrier thickness [μm] | Adhesive tape thickness [μm] | DuPont z E [J]* | Drop tower test E [J]* | Redetachability [1-5]* | Stretching distance [mm]* |
|---|---|---|---|---|---|---|---|
| 6 | PUD 4 | 100 | 330 | 1.07 | 1.68 | 4 | 0.00 |
| 7 | PUD 5 | 100 | 330 | 1.08 | 1.53 | 4 | 0.08 |
| 8 | PUD 6 | 100 | 330 | 1.10 | 1.28 | 5 | 0.09 |
| 2 | TPU 2 | 100 | 330 | 1.03 | 1.35 | 4 | 0.05 |

*each determined as described in the Test Methods part of the application.

The adhesive tapes of all Inventive Examples 1 to 8 meet the demands made on impact resistance in z direction according to the DuPont test in z direction and the drop tower test of at least 1.00 J in each case. They likewise each have good redetachability (i.e. (a) essentially no tears and at most slight adhesive residues that are easily removable with ethanol, which corresponds to a value of at least 4 in our test, or even no tears and no residues and no pull-off angle dependence, which corresponds to a value of at least 5 in our test). They are also each characterized by a stretching distance of not more than 0.15 mm in the stretching test.

A comparison of the adhesive tapes of Examples 5 to 7 additionally shows that the stretching distance in particular can be optimized by suitable contents of expanded microballoons in the PUD carrier.

The adhesive tape from Comparative Example 9 containing the double-sidedly etched PET carrier film of thickness 50 μm fails to achieve the target stretching distance of not more than 0.15 mm in the stretching test.

Test Methods

Unless stated otherwise, all measurements were conducted at 23° C. and 50% rel. air humidity. The mechanical and adhesive data were ascertained as follows:

Penetration Toughness: DuPont Test in the z Plane

A square sample in the shape of a frame is cut out of the adhesive tape to be examined (external dimensions 33 mm×33 mm; border width 2.0 mm; internal dimensions (window cut-out) 29 mm×29 mm). This sample is stuck to a polycarbonate (PC) frame (external dimensions 45 mm×45 mm; border width 10 mm; internal dimensions (window cut-out) 25 mm×25 mm; thickness 3 mm). A PC window of 35 mm×35 mm is stuck to the other side of the double-sided adhesive tape. The bonding of PC frame, adhesive tape frame and PC window is effected such that the geometric centres and the diagonals are each superimposed on one another (corner-to-corner). The bonding area is 248 $mm^2$. The bond is subjected to a pressure of 248 N for 5 s and stored under conditions of 23° C./50% relative humidity for 24 hours.

Immediately after the storage, the adhesive composite composed of PC frame, adhesive tape and PC window is braced by the protruding edges of the PC frame in a sample holder such that the composite is aligned horizontally. The PC frame rests flat on the protruding edges of the sample holders, such that the PC window is free-floating (held by the adhesive tape specimen) below the PC frame. The sample holder is then inserted centrally into the intended receptacle of the "DuPont Impact Tester". The impact head of weight 150 g is used in such a way that the circular impact geometry with a diameter of 24 mm impacts centrally and flush on the face of the PC window freely accessible from above.

A weight having a mass of 150 g guided on two guide rods is allowed to drop vertically from a height of 5 cm onto the composite composed of sample holder, sample and impact head thus arranged (test conditions: 23° C., 50% relative humidity). The height from which the weight dropped is increased in 5 cm steps until the impact energy introduced destroys the sample as a result of the penetration stress and the PC window parts from the PC frame.

In order to be able to compare experiments with different samples, the energy is calculated as follows:

$$\text{Energy } E \text{ [J]=Height [m]*mass weight [kg]*9.81 kg/m*s}^2$$

Five samples per product are tested, and the mean energy is reported as index for penetration resistance.

Drop Tower Test Method (Instrumented Drop System Test for Measurement of Impact Resistance)

A square sample in the shape of a frame is cut out of the adhesive tape to be examined (external dimensions 33 mm×33 mm; border width 2 mm; internal dimensions (window cut-out) 29 mm×29 mm). This sample is stuck to an acetone-cleaned steel frame (external dimensions 45 mm×45 mm; border width 10 mm; internal dimensions (window cutout) 25 mm×25 mm). On the other side of the double-sided adhesive tape is bonded an acetone-cleaned steel window (external dimensions 35 mm×35 mm). The bonding of steel frame, adhesive tape frame and steel window is effected such that the geometric centres and the diagonals are each superimposed on one another (corner-to-corner). The bonding area is 248 $mm^2$. The bond is subjected to a pressure of 248 N for 5 s and stored under conditions of 23° C./50% relative humidity for 24 hours.

Immediately after the storage, the test specimen is placed in the sample holder of the instrumented drop apparatus in such a way that the composite is horizontal with the steel window facing downward. The measurement is effected with instrument monitoring and automatically using a load weight of 5 kg and a drop height of 10 cm. The kinetic energy introduced by the load weight destroys the bond, and the force is recorded by a piezoelectric sensor every μs. Shortly before the impact of the rectangular impact geometry on the window, the speed of the falling weight is determined by two light beams. Assuming that the energy introduced is large compared to the impact resistance of the bond, the force progression, the time taken for detachment and the speed of the falling weight are used to ascertain the work performed by the bond before complete detachment (i.e. the energy E). Five test specimens of each sample are examined; the final impact resistance result consists of the average of the detachment work and the maximum force for these five samples.

Stretching Test Method (Stretching Distance)

A T-shaped aluminium block (external dimensions 25×25 mm) is bonded centrally over the full area to the outside of a steel window (external dimensions 35 mm×35 mm). A square sample in the shape of a frame is cut out of the adhesive tape to be examined (external dimensions 33 mm×33 mm; border width 2 mm; internal dimensions (window cut-out) 29 mm×29 mm). This sample is stuck to an acetone-cleaned steel frame (external dimensions 45 mm×45 mm; border width 10 mm; internal dimensions (window cutout) 25 mm×25 mm). On the other side of the double-sided adhesive tape, the acetone-cleaned steel window is stuck to the front side—the opposite side from the T-shaped aluminium block. The bonding of steel frame, adhesive tape frame and steel window is effected such that the geometric centres and the diagonals are each superimposed on one another (corner-to-corner). The bonding area is 248 $mm^2$. The bond is subjected to a pressure of 248 N for 5 s and stored under conditions of 23° C./50% relative humidity for 24 hours.

Immediately after the storage, the test specimen is inserted into a sample holder in such a way that the composite is horizontal with the T-shaped aluminium block of the steel window facing downward. A caliper gauge is used to determine the distance from the steel window in all four corners $A_{1-4\ initial}$ of the steel frame window section. This corresponds to the thickness of the steel frame and the thickness of the adhesive tape. The weight is suspended in the hole in the T block, and is a load weight of 250 g. The sample holder is placed into a climate-controlled chamber at 55° C. and 95% r.h., and the controlled climate storage period begins.

Every 24 h, the sample holder is taken out of the climate-controlled chamber, and the distance in all four corners of the steel frame is determined as a function of storage time. When the bond parts, the time and failure type are noted.

The measurement ends after 144 h of climate-controlled storage. The average of the distances A1-4 after storage for 144 h is calculated, and the average initial distance A1-4 initial is subtracted. This length is referred to as the stretching distance and corresponds to the change in length of the adhesive tape in orthogonal direction to the contact surface over the period of climate-controlled storage of the test specimen.

The average of the stretching distance of three test specimens examined per adhesive tape gives the result value with specification of the load weight, the climatic conditions and the climate-controlled storage time.

Redetachability

A sample in strip form (external dimensions 8 mm×40 mm) is cut out of the double-sided adhesive tape to be examined. This sample is stuck to an ethanol-cleaned polycarbonate sheet (Lexan® 9030, external dimensions 200 mm×50 mm×3 mm). Three individual strips should be bonded in parallel at a distance of at least 1 cm. The cover of the double-sided tapes should not be removed here. The adhesive tape ends at the edge of the substrate.

The bonds are activated with a 4 kg steel roll by at least 3 back-and-forth strokes (about 100 mm/s) and conditioned at 80° C./80% relative humidity for 48 h.

After storage, the test specimen is cooled down at RT for two hours, and the bond is likewise removed manually at RT. The tester makes an assessment during the removal.

3 test specimens of each sample are examined; redetachability is rated on a range from 1 to 5. The number 5 represents the best results.

| Assessment | Performance |
|---|---|
| 5 (best result) | No tears and no residues and no pull-off angle dependence |
| 4 | No tears and slight residues easily removable with EtOH,a nd there is no pull-off angle dependence |
| 3 | Moderate risk of a tear and there is no pull-off angle dependence and residues are easily removable with ethanol |
| 2 | High risk of a tear and residues are removable with ethanol |
| 1 | High number of tears and/or it is impossible to remove the tape from the substrate and/or cohesive failure of the adhesive, which is not removable with ethanol |

Shore A Hardness

The Shore A hardness of a sample is ascertained to ASTM D2240.

Modulus at 100% Elongation

The modulus at 100% elongation of a sample is ascertained to DIN 53504.

Thickness

The thickness of an adhesive layer can be determined by determining the thickness of a section, defined in terms of its length and width, of such an adhesive layer applied to a liner, minus the (known or separately determinable) thickness of a section of the same dimensions of the liner used. The thickness of the adhesive layer can be determined by means of commercial thickness measuring instruments (caliper test instruments) with accuracies of less than a 1 μm variance. If variations in thickness are found, the average of measurements at at least three representative sites is reported, i.e. more particularly not measured at creases, folds, specks and the like.

Like the thickness for an adhesive layer as above, it is also possible to ascertain the thickness of an adhesive tape (adhesive strip) or of a carrier in an analogous manner by means of commercial thickness measuring instruments (caliper test instruments) with accuracies of less than a 1 μm variance. If variations in thickness are found, the average of measurements at at least three representative sites is reported, i.e. more particularly not measured at creases, folds, specks and the like.

Density

The density of adhesive layers is ascertained by forming the quotient of mass applied and thickness of the adhesive layer applied to a liner.

The mass applied can be determined by determining the mass of a section, defined in terms of its length and width, of such an adhesive layer applied to a liner, minus the (known or separately determinable) mass of a section of the same dimensions of the liner used.

The thickness of an adhesive layer can be determined by determining the thickness of a section, defined in terms of its length and width, of such an adhesive layer applied to a liner, minus the (known or separately determinable) thickness of a section of the same dimensions of the liner used. The thickness of the adhesive layer can be determined by means of commercial thickness measuring instruments (caliper test instruments) with accuracies of less than a 1 μm variance. If variations in thickness are found, the average of measurements at at least three representative sites is reported, i.e. more particularly not measured at creases, folds, specks and the like.

The density of a carrier can be determined analogously.

Static Glass Transition Temperature $T_g$

Glass transition points—referred to synonymously as glass transition temperatures—are reported as the result of measurements by means of differential scanning calorimetry (DSC) according to DIN 53 765, especially sections 7.1 and 8.1, but with uniform heating and cooling rates of 10 K/min in all heating and cooling steps (cf. DIN 53 765; section 7.1; note 1). The sample weight is 20 mg.

Molecular Weight $M_n$, $M_w$

The values reported for number-average molar weight $M_n$ and weight-average molar weight $M_w$ relate to determination by gel permeation chromatography (GPC) in this document. The determination is carried out using a clear-filtered 100 µl sample (sample concentration 4 g/l). The eluent used is tetrahydrofuran with 0.1% by volume of trifluoroacetic acid. The measurement is made at 25° C. The precolumn used is a column of the PSS-SDV type, 5 µm, $10^3$ Å, 8.0 mm×50 mm (values here and hereinafter in the following sequence: type, particle size, porosity, internal diameter*length; 1 Å=$10^{-10}$ m) For separation, a combination of the columns of the PSS-SDV type, 5 µm, $10^3$ Å and $10^5$ Å and $10^6$ Å each with 8.0 mm*300 mm is used (columns from Polymer Standards Service; detection by means of Shodex RI71 differential refractometer). The flow rate is 1.0 ml per minute. In the case of polar molecules, for example the starting materials for the polyurethane or in the case of polyacrylates, calibration is effected against PMMA standards (polymethylmethacrylate calibration), and otherwise against PS standards (polystyrene calibration).

Tackifying Resin Softening Temperature

The tackifying resin softening temperature is carried out in accordance with the relevant methodology, which is known as Ring & Ball and is standardized according to ASTM E28.

The invention claimed is:

1. An adhesive tape comprising:

(a) at least one carrier that has a thickness of 20 µm to 250 µm and comprises at least one layer comprising polyurethane foamed with microballoons, wherein the at least one layer comprising polyurethane foamed with microballoons has been produced from a dispersion comprising dispersed polyurethane into which the microballoons have been introduced, wherein the polyurethane is optionally crosslinked; and (b) a pressure-sensitive adhesive layer is disposed on at least one side of the carrier, wherein the pressure-sensitive adhesive layer consists of: (i) polyacrylate; (ii) vinylaromatic block copolymer essentially immiscible with the polyacrylate; (iii) at least one optional crosslinker; (iv) at least one optional microballoon; (v) at least one optional microbead; and (vi) a combination thereof (i)-(v), and the pressure-sensitive adhesive layer comprises 50% to 90% by weight of the polyacrylate and 10% to 50% by weight of vinylaromatic block copolymer.

2. Adhesive tape according to claim 1, wherein the at least one layer comprising polyurethane is based on polyurethane that has a modulus at 100% elongation of not more than 1.8 MPa.

3. Adhesive tape according to claim 2, wherein the polyurethane is aliphatic polyester polyurethane or aliphatic polyether polyurethane.

4. Adhesive tape according to claim 1, wherein the at least one layer comprising polyurethane is thermoplastic.

5. Adhesive tape according to claim 1, wherein the at least one carrier does not have a crystalline superstructure.

6. Adhesive tape according to claim 1, wherein the (i) polyacrylate is derived from:

acrylic acid/ester and/or methacrylic acid/ester of the formula CH2=C(R1)(COOR2) where R1=H or CH3 and R2=H or linear, branched or cyclic, saturated or unsaturated alkyl radicals having 1 to 30 carbon atoms.

7. Adhesive tape according to claim 1, wherein the pressure-sensitive adhesive layer has been foamed.

8. Adhesive tape according to claim 1, wherein the dispersion is free of organic solvent.

9. Process for producing the adhesive tape of claim 1, comprising coating the dispersion comprising dispersed polyurethane into which the microballoons have been introduced (a) onto a temporary carrier and drying, and combining a resultant carrier with the pressure-sensitive adhesive layer on at least one side, or (b) onto the pressure-sensitive adhesive layer and drying, and optionally combining the resultant carrier with a further pressure-sensitive adhesive on a side opposite from the pressure-sensitive adhesive layer, so as to result in the adhesive tape.

10. Process according to claim 9, in which the resultant carrier is applied to the temporary carrier and then laminated with the pressure-sensitive adhesive layer on at least one side.

11. Process according to claim 9, in which the resultant carrier is coated onto the pressure-sensitive adhesive layer and the resultant carrier is simultaneously at the same time combined with a further pressure-sensitive adhesive on the opposite side from the pressure-sensitive adhesive layer.

12. Process according to claim 9, in which the resultant carrier is combined with the pressure-sensitive adhesive layer by coating the pressure-sensitive adhesive layer directly onto the resultant carrier, where the pressure-sensitive adhesive layer is optionally (a) coated onto the resultant carrier as a solution and dried, or (b) extruded onto the resultant carrier as a plastic melt.

13. Method comprising bonding the adhesive tape of claim 1 to a component of an electrical, electronic, optical, or precision mechanical device.

* * * * *